(12) United States Patent
Yehuda et al.

(10) Patent No.: US 7,822,707 B1
(45) Date of Patent: Oct. 26, 2010

(54) OBJECT SEARCHING AND MANAGEMENT INFORMATION VIEWING IN A STORAGE AREA NETWORK ENVIRONMENT

(75) Inventors: Hanna Yehuda, Newton, MA (US); Amanuel Ronen Artzi, Framingham, MA (US); Ju-Lien Lim, Reading, MA (US); Roland Raphael Baenziger, Palm Coast, FL (US)

(73) Assignee: EMC Corporation, Hopkinton, MA (US)

( * ) Notice: Subject to any disclaimer, the term of this patent is extended or adjusted under 35 U.S.C. 154(b) by 425 days.

(21) Appl. No.: 11/864,126

(22) Filed: Sep. 28, 2007

(51) Int. Cl.
*G06F 7/00* (2006.01)
*G06F 17/00* (2006.01)
*G06F 17/30* (2006.01)

(52) U.S. Cl. ...................... 707/609; 707/792

(58) Field of Classification Search .................. None
See application file for complete search history.

(56) References Cited

U.S. PATENT DOCUMENTS 6,966,033 B1 * 11/2005 Gasser et al. ............... 715/738

* cited by examiner

*Primary Examiner*—Mohammad Ali
*Assistant Examiner*—Kannan Shanmugasundaram
(74) *Attorney, Agent, or Firm*—Chapin IP Law, LLC

(57) ABSTRACT

A configuration management tool initiates display of a listing of multiple different types of managed resources present in a storage area network environment. Based on user input, the resource manager receives a selection of two or more types of managed resources from the listing. In addition to receiving a select of two or more types of resources in the listing, the resource manager application receives search criteria associated with each of the selected two or more types of managed resources. The configuration manager initiates a search for objects (in one or more repositories) that satisfy the search criteria and are of a managed resource type as indicated by the selection. The configuration manager application then produces a report indicating the objects (i.e., storage area network resources and corresponding management information) that satisfy the search criteria. After receiving the report (e.g., search results) that satisfies the search criteria, the user can select a storage area network resource in the report to view information associated with the selected resource. Further, the user can select from multiple different viewing options to view different types of information associated with the selected resource.

17 Claims, 24 Drawing Sheets

FIG. 5

| Attribute | Value |
|---|---|
| Host name | losbc042 |
| Type | Physical |
| Domain name | lss.emc.com |
| IP addresses | 172.23.142.42, 166.159.12.3, 127.0.0.1 |
| Operating system | Windows |
| Operating system version | 2003 R2 |
| Vendor and version Multi-path software | EMC Powerpath 4.3.2 |
| Solutions Enabler version | 6.4-827 |
| Server vendor | Dell |
| Server model | 8520 |
| CPU | 2 x 3GHz |
| Physical memory (GB) | 8 |
| Location | UC Lab, tile 338, rack 2 |
| Status | Online, Normal |
| Cluster member of | n/a |
| Created by | Automatic Discovery |

OBJECT SEARCHING AND MANAGEMENT INFORMATION VIEWING IN A STORAGE AREA NETWORK ENVIRONMENT

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client applications that request data from the data storage systems. For example, according to conventional applications, upon receiving a storage access request, a respective host computer that is part of the storage area network accesses a large repository of storage through the switching fabric of the storage area network on behalf of the requesting client. Thus, via the host computer (e.g., server), a client has access to the shared storage system through the host computer. Not all interactions are client server related as some access are done for backup, maintenance, disaster recovery, etc. In many applications, storage area networks support hi-speed acquisitions of data so that the host servers are able to promptly retrieve and store data from the data storage system.

Conventional storage area network management applications typically include a graphical user interface (GUI) that enables a storage area network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network.

Based on use of the graphical user interface in combination with an input device such as a hand operated mouse and corresponding pointer displayed on a viewing screen, a storage administrator is able to manage hardware and software entities such as file systems, databases, storage devices, volumes, peripherals, network data communications devices and communication paths, etc., associated with the storage area network.

According to one conventional management application, a network administrator can manually traverse a hierarchical tree of storage area network resources to identify a presence of resources in a storage area network environment. Based on selection of (e.g., clicking on) items in the hierarchical tree, the respective user is able to view configuration information associated with the selected items.

SUMMARY

Conventional storage area network management applications such as those as discussed above suffer from a number of deficiencies. For example, use of a conventional hierarchical tree to find resources of interest (e.g., instances of certain storage area network resources) tends to be quite complex and time consuming because there are typically many different types of resources and interrelations in a storage area network. When there are so many different types of resources in a hierarchical tree, it can be difficult to find a particular resource more so to navigate to point of interest given one was found. To compound matters, each resource type may include hundreds or even thousands of resources of a particular type, making it yet more difficult to find one or more resources of interest. In more complex storage area network environments, a storage area network manager must manage millions of managed objects including volumes, host devices, I/O paths, etc.

Moreover, a network administrator may wish to view configuration information associated with multiple related storage area network resources rather than view only management information associated with a single storage area network resource. To view such information according to conventional techniques, the network administrator must manually traverse the hierarchical tree to identify and select the instances of the different related storage area network resources and corresponding management information to view simultaneously on a display screen. The resources of interest may reside at different branches of the hierarchical tree of resources. Thus, this process of initiating display of related storage area network information according to conventional methods is somewhat like building a complex puzzle.

Embodiments discussed herein deviate with respect to conventional applications. For example, embodiments herein provide a novel and useful way for managing, searching, and viewing configuration information associated with resources in a storage area network environment.

More specifically, according to one embodiment herein, a configuration manager application initiates display of a listing of multiple different types of managed resources present in a storage area network environment. Based on input from a user, the configuration manager receives a selection of two or more types of managed resources from the listing.

Each of the two or more types of resources in the listing specifies a corresponding resource class type. As an example, the listing can include different storage area network resource class types such as host type resources, fabric type resources, storage resources, etc. Each resource class type can be associated with or related to multiple resources of that type depending on a respective configuration of a storage area network. For example, a storage area network can include 10 host type resources. Because there is a managed object for each host resources, the host resource class has ten corresponding managed objects.

The objects include resource management information associated with corresponding resources in the storage area network environment. For example, a host object includes management information associated with a corresponding host resource, a switch object includes information associated with a corresponding switch resource, and so on.

In addition to receiving a selection of two or more types of resource in the listing, the resource manager application receives search criteria associated with each selected class type of managed resources to be searched. Based on the search criteria, the resource manager initiates a search for objects (in one or more repositories) that satisfy the search criteria and are of a managed resource type as indicated by the selection.

The resource manager application then produces a report indicating the objects that satisfy the search criteria. Accordingly a respective user can find resources and corresponding management information associated with resources in a storage area network environment without having to manually traverse a hierarchical tree of resources to find and view resources of interest as well as related objects.

In yet further embodiments, a respective user can select objects or storage area network resources in the report (i.e., search results) for viewing of respective management information. For example, based on additional input such as selection of one or more of the objects in the report, the resource manager application displays storage area network resource management information to a respective user. The resource manager then provides different viewing options enabling the respective user to view management information associated with the selected storage area network resource from different perspectives. Thus, embodiments herein enable a respective user to efficiently search for and thereafter view management information associated with selected storage area network resource from different perspectives.

Based on such techniques such as those as discussed above as well as those discussed below, a respective user can efficiently search for and view different perspectives of storage area network resource management information.

Note that embodiments disclosed herein include any type of computerized device, workstation, handheld or laptop computer, or the like configured with software and/or circuitry (e.g., a processor) to process any or all of the method operations disclosed herein. In other words, embodiments herein can include a computerized device such as a computer or storage area network manager or any type of processor that is programmed or configured to provide task management functions as explained herein.

Other embodiments disclosed herein include software programs to perform the steps and operations summarized above and disclosed in detail below. One such embodiment comprises a computer program product that has a (tangible) computer-readable medium including computer program logic encoded thereon that, when performed in a computerized device having a coupling of a memory and a processor, programs the processor to perform any of the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

In addition to the embodiments discussed above, other embodiments herein include a computerized device (e.g., a host computer, workstation, etc.) configured to support the techniques disclosed herein such as searching and display of management information. In such embodiments, a computer environment to carry out the invention includes a memory system, one or more processors (e.g., a processing devices), and an interconnect connecting the processor and the memory system. The memory system can be encoded with an application that, when executed on a respective processor, supports indexing information. correlation, searching and display functionality for management of storage area network resources according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support resource management and related functions according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

As an example, a more particular technique of the present disclosure is directed to a computer program product or computer environment that includes a computer readable medium having instructions stored thereon to facilitate management of storage area network resources. The instructions and their corresponding execution support operations of: i) receiving selection of at least two types of managed resources present in a storage area network environment, each of the at least two types of resources specifying a corresponding class type of multiple objects including resource management information; ii) receiving search criteria associated with each of the selected at least two types of managed resources; iii) initiating a search for objects that satisfy the search criteria and are of a managed resource type as indicated by the selection; and iv) producing a report indicating the objects that satisfy the search criteria.

As mentioned above, other embodiments of the present disclosure include hardware and/or software programs to perform any of the method embodiment steps and operations summarized above and disclosed in detail below. For example, it should be understood that the system disclosed herein may be embodied strictly as a software program, as software and hardware, or as hardware alone. Also, note that the concepts disclosed herein may be employed in storage area network environment equipment such as those developed by EMC, Inc., of Hopkinton, Mass.

Techniques herein are well suited for use in resource management applications such as those that supporting searching and viewing of storage area network resource management information. However, it should be noted that configurations herein are not limited to such use and thus configurations herein and deviations thereof are well suited for use in other environments as well.

Each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

BRIEF DESCRIPTION OF THE DRAWINGS

The foregoing and other objects, features and advantages disclosed herein will be apparent from the following description of particular embodiments, as illustrated in the accompanying drawings in which like reference characters refer to the same parts throughout the different views. The drawings are not necessarily to scale, emphasis instead being placed upon illustrating the principles disclosed herein.

FIGS. 5-9 are example screenshots illustrating different perspectives of host resource information according to embodiments herein.

FIGS. 13-18 are example screenshots illustrating a graphical user interface and display of storage area network resource information according to embodiments herein.

DETAILED DESCRIPTION

As discussed below, one embodiment herein includes a resource manager application that initiates display of a listing of multiple different types of managed resources present in a storage area network environment. Based on user input, the resource manager receives a selection of two or more types of managed resources from the listing. In addition to receiving a select of two or more types of resources in the listing, the resource manager application receives search criteria associated with each of the selected two or more types of managed resources. The resource manager initiates a search for objects (in one or more repositories) that satisfy the search criteria and are of a managed resource type as indicated by the selection. Based on the search, the resource manager application then produces and displays a report indicating any objects (i.e., storage area network resources and corresponding management information) that satisfy the search criteria.

Based on additional input such as selection of one or more of the objects in the report, the resource manager application displays storage area network resource management information to a respective user. In one embodiment, the respective user can select from multiple different viewing options to view different perspectives of management information associated with a respective storage area network resource.

Figure 1:
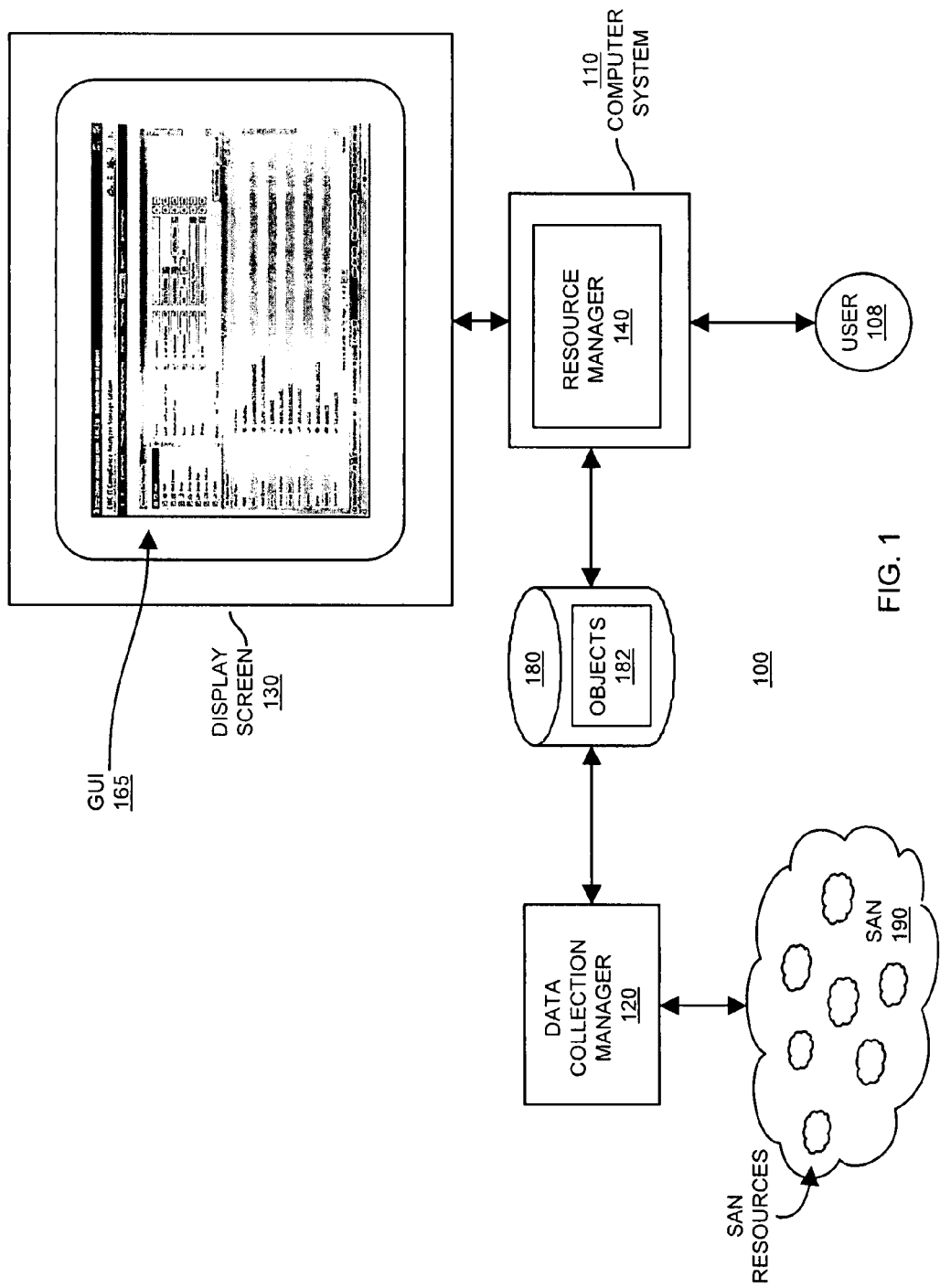
FIG. 1 is an example diagram illustrating collection of resource data and use of a resource manager to search and view storage area network resource information according to embodiments herein.

Now, more specifically, FIG. 1 is an example diagram illustrating collection of resource data (e.g., discovery) and use of a resource manager 140 and related functions according to embodiments herein. Use of the resource manager 140 (which enables viewing of information associated with resources in a storage area network) will be more particularly discusses in FIGS. 2-24. Note that the search functionality as described herein works on entities such as those that were discovered as well as on entities (e.g., resources such as paths, policies, rules, etc.) that were created by the resource manager.

As shown in FIG. 1, storage area network environment 100 includes storage area network 190 of storage area network resources, data collection manager 120, repository 180, objects 182 stored in repository 180, computer system 110, display screen 130, resource manager 140 running on computer system 110, and user 108.

As its name suggests, data collection manager 120 collects or discovers data (e.g., network resource information) from resources, services, processes, switch applications, etc. operating and/or present in storage area network 190 or storage area network environment 100. Storage area network 190 can include one or more networks of sub-resources having data collected by data collection manager 120.

Data collection manager 120 can be configured to collect information in many different ways. For example, data collection manager 120 can initiate direct queries to resources in respective network 190. Queries can include requests for configuration data associated with a queried resource. Responses to queries can include data such as version information associated with a particular application, identifier information, network address information, vendor information, protection information, etc. associated with a queried resource. After data collection, the data collection manager 120 then stores the received information in repository 180 for management by user 108 via resource manager 140.

Note that the data resource manager 120 can also retrieve information from resources based on indirect queries. For example, the data collection manager 120 can communicate with agents that themselves collect resource data on behalf of the data collection manager 120.

In addition to direct and indirect queries, the data collection manager 120 can also monitor connections or connectivity by monitoring or eavesdropping on message information transmitted between the network resources present in network 190. For example, the data collection manager 120 can be configured to intercepts and/or analyze the message data transmitted in network 190 and store appropriate information about different monitored connections in repository 180.

Based on analyzing the message data, the data collection manager 120 can identify different types of information such as a protocol used to support communicates between applications, whether two or more applications communicate via encrypting data, types of information exchanged between the two or more, which applications communicate with each other, etc.

In one embodiment, the data collection manager 120 analyzes the collected data and stores the analyzed information as objects in a repository 180 (e.g., a database or other storage device). Each object in the repository includes information associated with a respective storage area network resource in the storage area network 190. Storage of the collected information (and/or other derived information) can include classifying the information in one of three classes such as whether the resource information is associated with a host resource, a connection, or service in network 190 as well as creating relationships between objects as analyzed based on discovered information. This classification is only example and can be extended to any number of classes, sub-classes, etc.

Note that in one embodiment, more objects and relationships are created after discovery information is analyzed. As discussed above, discovery information is not the only type of objects or resources that will be searched. As shown in listing 245 as will be discussed with respect to FIG. 2), policies, rules, change notifications, etc. can be searched as well.

As an example of an embodiments herein, the network 190 can include resources such as clients, servers, switches, storage devices, host resources, connections, etc. supporting communications between computer systems, services, etc. in network 190. A network resource such as a client resource (e.g., a computer system) can be classified as a host resource.

Computer system 110 can be configured to support a number of applications such as operating systems, text editor applications, e-mail applications, etc. as is needed to carry out resource management.

Upon collection of data associated with the sub-resources (e.g., operating system, text editors applications, etc.), the data collection manager 120 stores the information in corresponding objects in repository 180. Each object (e.g., representing a resource or sub-resource) in the repository 180 includes information about the storage area network resource such as software version information, vendor information, computer system on which the application operates, etc.

The data collection manager 120 also saves information associated with other types of management tools or resources associated with storage area network environment 100 such as rules, policies, policy scopes, etc.

In one embodiment, the data collection manager 120 stores the information in repository 180 as a hierarchical tree of information. Pointers associated with the objects indicate how the objects are related to each other.

Via retrieval of data stored in repository 180, the resource manager 140 enables the user 108 (e.g., a network administrator) to manage any aspect of the storage area network environment 100. Retrieval of object data from repository 180 can be achieved via queries (e.g., SQL queries) applied to repository 180.

As discussed above and as will be discussed later in this specification, via a graphical user interface 165 on display screen 130, the resource manager 140 enables a respective user 108 to create policies and corresponding rules to view, modify, verify, etc. different discovered resource configurations and management information associated with storage area network environment 100.

Figure 2:
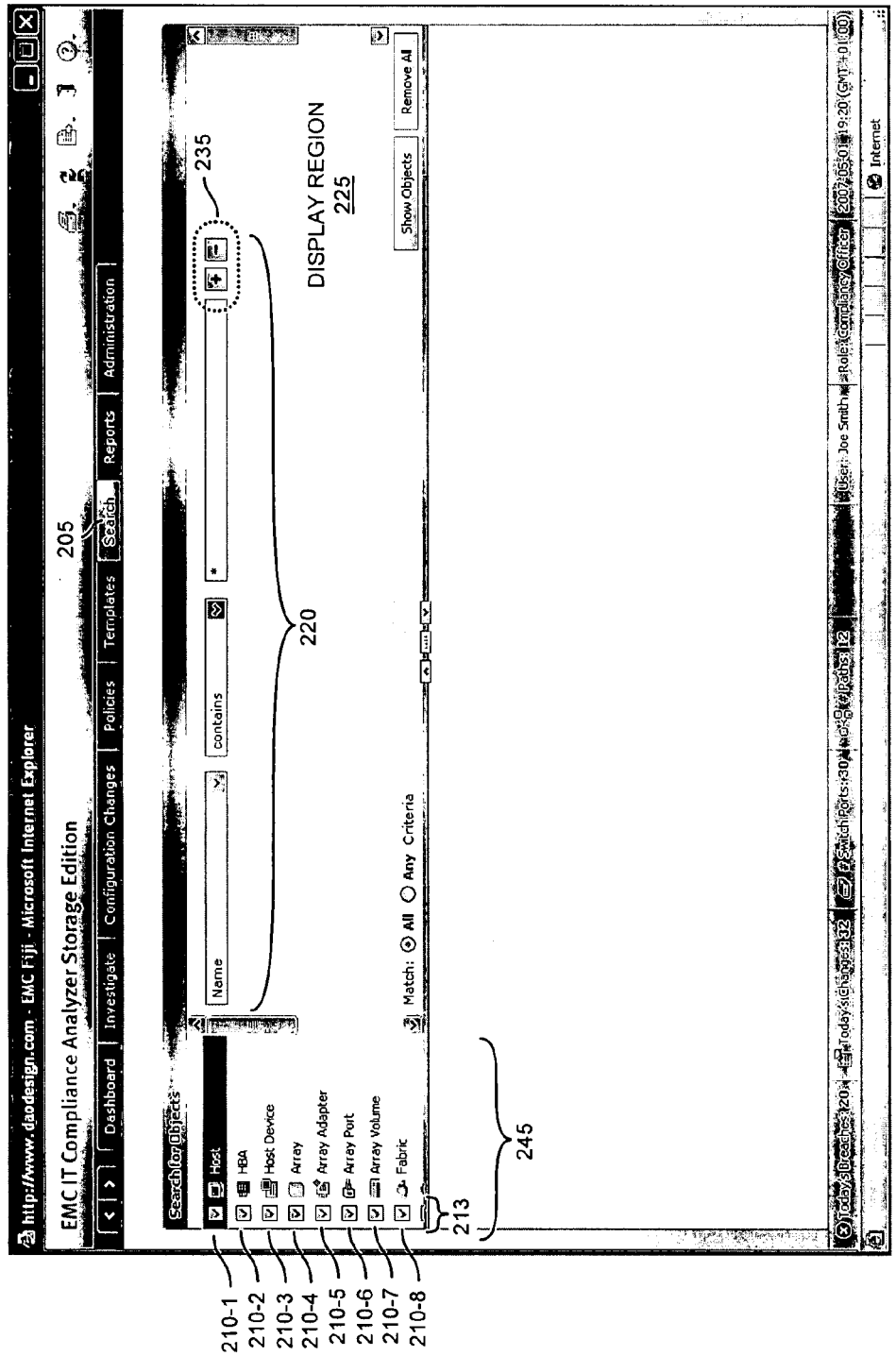
FIG. 2 is an example screenshot illustrating a graphical user interface enabling selection of different resource types according to embodiments herein.

FIG. 2 is an example screenshot 200 of graphical user interface 165 according to embodiments herein. Selection of (e.g., clicking on) display region 205 prompts resource manager 140 to initiate display of screenshot 200 of graphical user interface 165.

In general, and as further discussed below, screenshot 200 of graphical user interface 165 enables a respective user 108 such as a network administrator to search for a presence of different types of resources in the storage area network environment 100 and storage area network resources such as policies, notifications, breaches, etc. based on search criteria provided by the user 108. Further input to the graphical user interface 165 enables the user to retrieve the stored configuration management information associated with the different types of resources for viewing as display screen 130.

More specifically, via listing 245 in screenshot 200, resource manager 140 presents multiple different types of storage area network resources present in storage area network 100. Listing 245 includes different types or classes of resources for selection by the user 108.

In the context of the present example, listing 245 includes symbol 210-1 for searching (selecting) host type resources in storage area network 190, symbol 210-2 for searching (selecting) host bus adapter (e.g., HBA) type resources, symbol 210-3 for searching host device type resources, symbol 210-4 for searching array (e.g., storage) type resources, symbol 210-5 for searching array adapter type resources, symbol 210-6 for searching array port type resources, symbol 210-7 for searching array volume type resources, symbol 210-8 for searching fabric type resources, and so on.

Other example resource types for inclusion in listing 245 include switch slots, VSAN, Rules, Policies, Policy Scope, Tape, Cluster, etc.

Each of symbols 210 in listing 245 has a corresponding box in column 213 to indicate whether it has been selected (via clicking) by user 108. For example, check marks in the boxes of column 213 indicate selection of a respective object types (classes) to be used in a subsequent search. Boxes without check marks indicate object types (classes) that are not selected for searching. In the present example, the user 108 has selected all of the boxes. Via listing 245 and boxes, embodiments herein enable the user 108 to easily identify selected types of managed resources as well as other non-selected types of managed resources to be part of the search scope.

Note that resource manager 140 supports additional highlighting other than check boxes in column 213. For example, in one embodiment, resource manager 140 enables a respective user 108 to select each of the respective symbols 210 or different rows of resource types for viewing corresponding search parameters in display region 225. In the present example, the user has selected the row representing host type resources. In response to the selection of the host type in listing 245, the resource manager 140 provides highlighting (e.g., shading) with respect to the row in listing 245 including host resource type and symbol 210-1.

Figure 3:
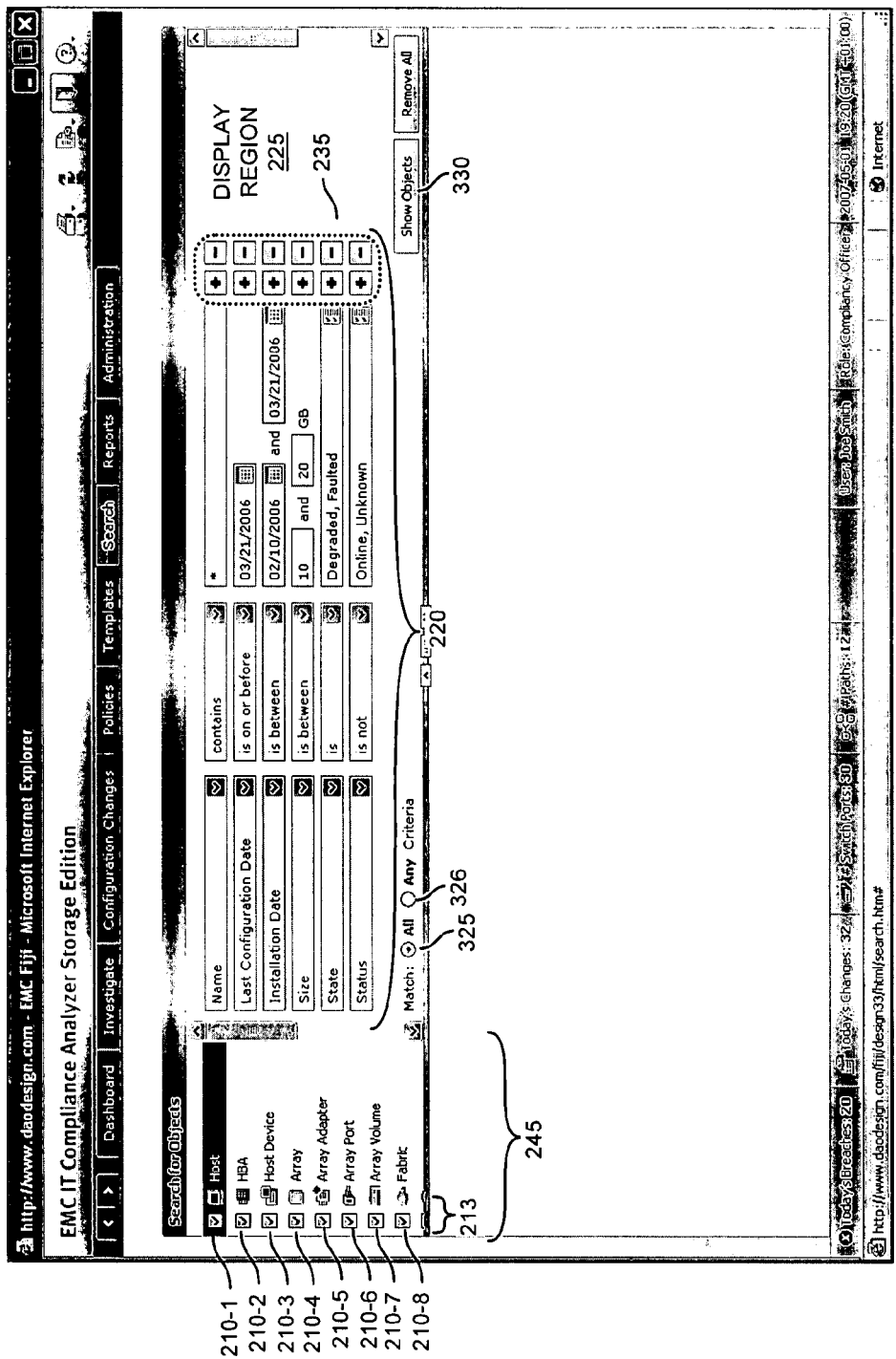
FIG. 3 is an example screenshot illustrating a graphical user interface including a display of search parameters according to embodiments herein.

For the highlighted resource type (e.g., the host type resource in this example), the resource manager 140 also initiates display search parameters 220 in display region 225. Via selection of "+" symbol in display region 235, the respective user can add different rows of search parameters 220 as shown in FIG. 3. To remove a search parameter row, the respective user 108 can click on the "−" symbol.

For each of the search parameters 220, the user 108 fills in corresponding data fields of the search parameter 220 to identify specific types of resources in the storage area network environment 100 that match criteria provided by the user 108. For example, one search parameter herein enables the user 108 to specify names (or portions thereof) of resources of interest to be included in corresponding search results.

As shown in screenshot 300 in FIG. 3, other search parameters 220 (and respective data fields) based on selection of + symbol in display region 235. The search parameters 220 enables the user 108 to specify resources of interest based on parameters such as last configuration date of the resource, installation date of the resource, size of the resource, state of the resource, status of the resource, and so on. A unique parameter would be a relationship such as: HostedBy or ConnectedTo that allows the user to parametrize the search to a specific topology/resource relationship graphs. For example, a user can search for hosts that are connectedTo switch X.

A combination of the search parameters 220 define corresponding search criteria to be use for finding matching objects or resources associated with the storage area network environment.

The user 108 can select display region 325 in FIG. 3 to indicate whether resources (e.g., corresponding objects) being searched must match all of the inputted search criteria as specified by search parameters 220 or only one search parameter 220 to be included in the search results. Display region 326 in FIG. 3 enables user 108 to apply an OR function in which search results would yield identities of objects that match any of the search parameter information in display region 225 rather than all search parameters.

According to other embodiments herein, graphical user interface 165 can provide the user with AND/OR options for each search parameter 220 for more fin-grained searching capability.

Accordingly, the user 108 can provide a set of search criteria to be used for searching objects of a particular type as specified by the highlighted row (e.g., host resource row in this example) in listing 245.

Note that the user 108 can change a highlighted selection from the host type resource in listing 245 to another selection. For example, the user can select the row in listing 245 specifying array (e.g., storage) type resources. In response to such a selection, the resource manager 140 initiates highlighting with respect to the newly selected resource type and displays relevant search parameters 220 in display region 225 for the newly selected type. In response to the selection, the resource manager 140 then displays search parameter 220 for the newly selected resource type. Thus, the search parameters in display region 225 change depending on which of the resource types is currently selected from listing 245.

Accordingly, embodiments herein include, for a first time duration, highlighting the selection of the first type of managed resource (e.g., the host type resource) in the listing 245 and simultaneously displaying a set of search parameters associated with the first type of selected resource in display region 225 for the user to define the search criteria for the first type of managed resource. For a subsequent time duration, after selection of the new resource type by the user 108, the resource manager 140 highlights the selection of the second type of managed resource (e.g., the array resource) in the listing and simultaneously displays a set of search parameters associated with the second type of selected resource in display region 225 for the user to define search criteria for the second type of resource.

After creating the appropriate search criteria for each resource type selected from listing 245 and selection of (e.g., clicking on) display region 330 (e.g., show objects button) to initiate a search, the resource manager 140 initiates a corresponding search process with respect to objects 182 in repository 180.

Figure 4:
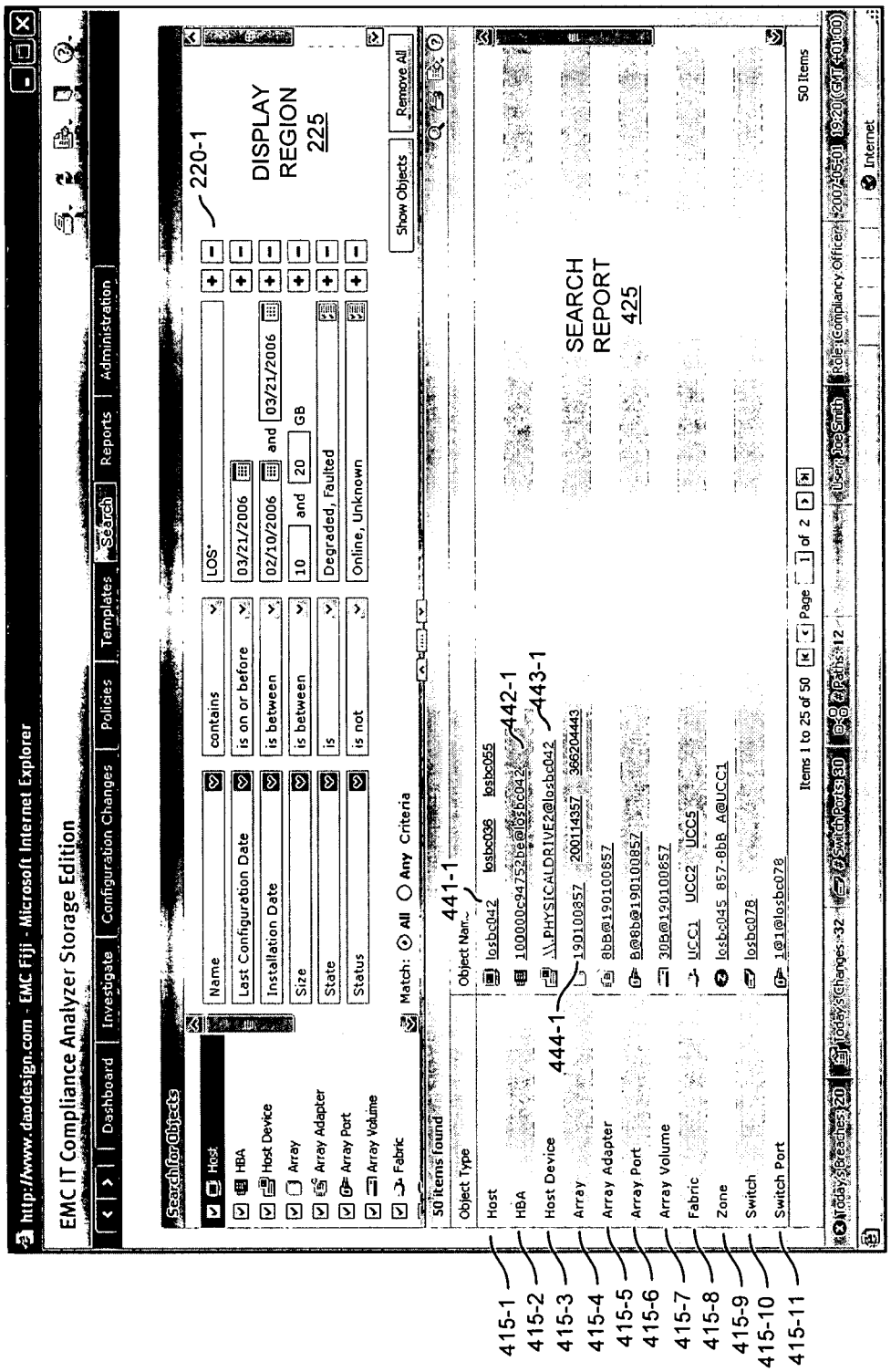
FIG. 4 is an example screenshot illustrating a graphical user interface including search results according to embodiments herein.

Based on the objects 182 in repository 180 that satisfy or match the search criteria as provided by user 108, the resource manager 140 initiates display of screenshot 400 in FIG. 4. Screenshot 400 includes an example search report 425 (e.g., search results) including identities of objects (e.g., storage area network resources) in repository 180 that match a resource type as specified by the selected object type in listing 245 as well as those that match inputted search parameter information in display region 225.

The search report 425 generated by resource manager 140 includes a column of display symbols 415, each of which represents a corresponding type of resource that was checked in the listing 245 to be searched. For example, symbol 415-1 indicates a class of host type resources, symbol 415-2 indicates a class of host bus adapter type resources, symbol 415-3 indicates a class of host device type resources, symbol 415-4 indicates a class of array type resources, symbol 415-5 indicates a class of array adapter type resources, symbol 415-6 indicates a class of array port type resources, symbol 415-7 indicates a class of array volume type resources, symbol 415-8 indicates a class of fabric type resources, symbol 415-9 indicates a class of zone type resources, symbol 415-10 indicates a class of switch type resources, and symbol 415-11 indicates a class of switch port type resources.

Beside each resource class type as specified by symbols 415 under the column labeled object type, the resource manager 140 initiates display of identities of the different resources in a particular resource class type that satisfy the search criteria. For example, search parameter 220-1 in display region 225 provides notification to resource manager 140 to search for host resources having a name staring with "LOS". The selectable links (e.g., pointers, hyperlinks, etc.) next to host symbol 415-1 thus include selectable link 441-1 (e.g., a hyperlink or pointer to object LOSBC042), selectable link 441-2 (e.g., LOSBC036), and selectable link 441-3 (e.g., LOSBC055). These resources also satisfy the other search criteria. In a similar manner, report 425 includes other sets of selectable links to objects in repository 180 that match search criteria provide by the user 108.

In response to receiving user selection of a given object (e.g., selection of a storage area network resource as specified by the selectable link 441-1) from the objects indicated in the report 425, the resource manager 140 presents a user with a default view of management information associated with the selected object. In other words, in response to the user selecting selectable link 441-1 with report 425, the resource manager 140 initiates display of screenshot 500 as shown in FIG. 5.

Screenshot 500 includes a display of a default view of configuration management information associated with Host resource LOSBC042. The default view for host resources is the host properties viewing option 520-1.

As its name suggests, host property viewing option 520-1 displays property information associated with host resource LOSBC042 as specified by the information retrieved from the LOSBC042 object stored in repository 180.

In one embodiment, the repository 180 stores a corresponding object (or multiple objects) associated with host resource LOSBC042. To display the configuration management information (e.g., host property information as shown in screenshot 500) in screenshot 500, the resource manager 140 retrieves the host property information (as displayed in screenshot 500) from the corresponding object (or multiple objects associated with LOSBC042) stored in repository 180.

As previously discussed, data collection manager 120 initiates a discovery function to create and store storage area network resource information in respective objects 182. Thus, configuration management information displayed in screenshot 500 can include most recently discovered data associated with the corresponding storage area network resource.

Based on selection of other viewing options 520, the resource manager 140 initiates display of different types of configuration management information for viewing by the respective user 108. For example, in response to selection of "connectivity" viewing option 520-3 in FIG. 5, the resource manager 140 retrieves appropriate information from an object/set of objects in repository 180 and initiates display of connectivity information (as retrieved from repository 180) associated with host resource LOSBC042 as shown in screenshot 600 of FIG. 6.

Figure 7:
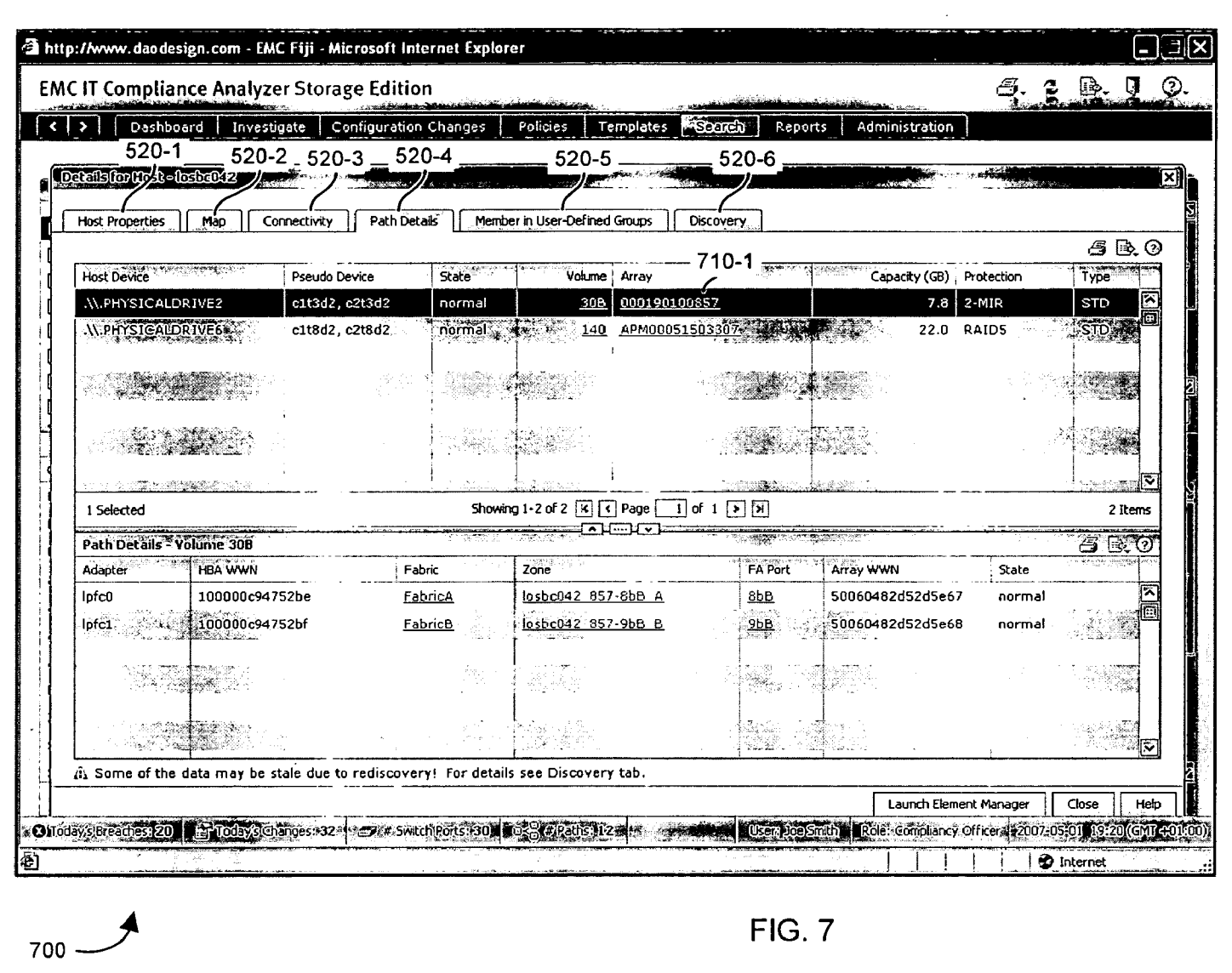

In response to selection of "path details" viewing option 520-4 in FIG. 5, the resource manager 140 retrieves appropriate information from repository 180 and initiates display of path detail information associated with host resource LOSBC042 as shown in screenshot 700 of FIG. 7.

Figure 8:
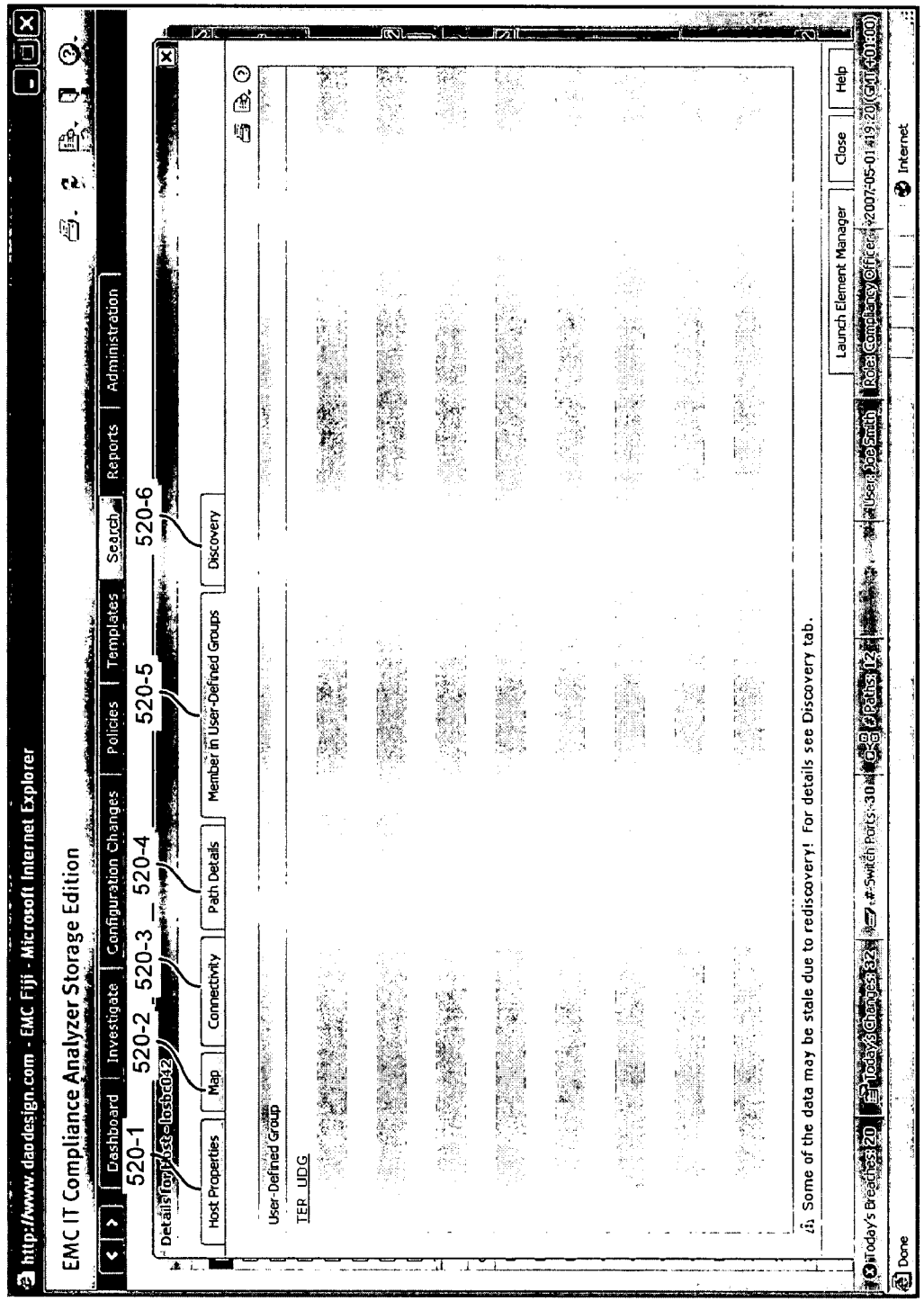

In response to selection of viewing option 520-5 in FIG. 5, the resource manager 140 initiates retrieval and display of appropriate member information associated with host resource LOSBC042 as shown in screenshot 800 of FIG. 8.

Figure 9:
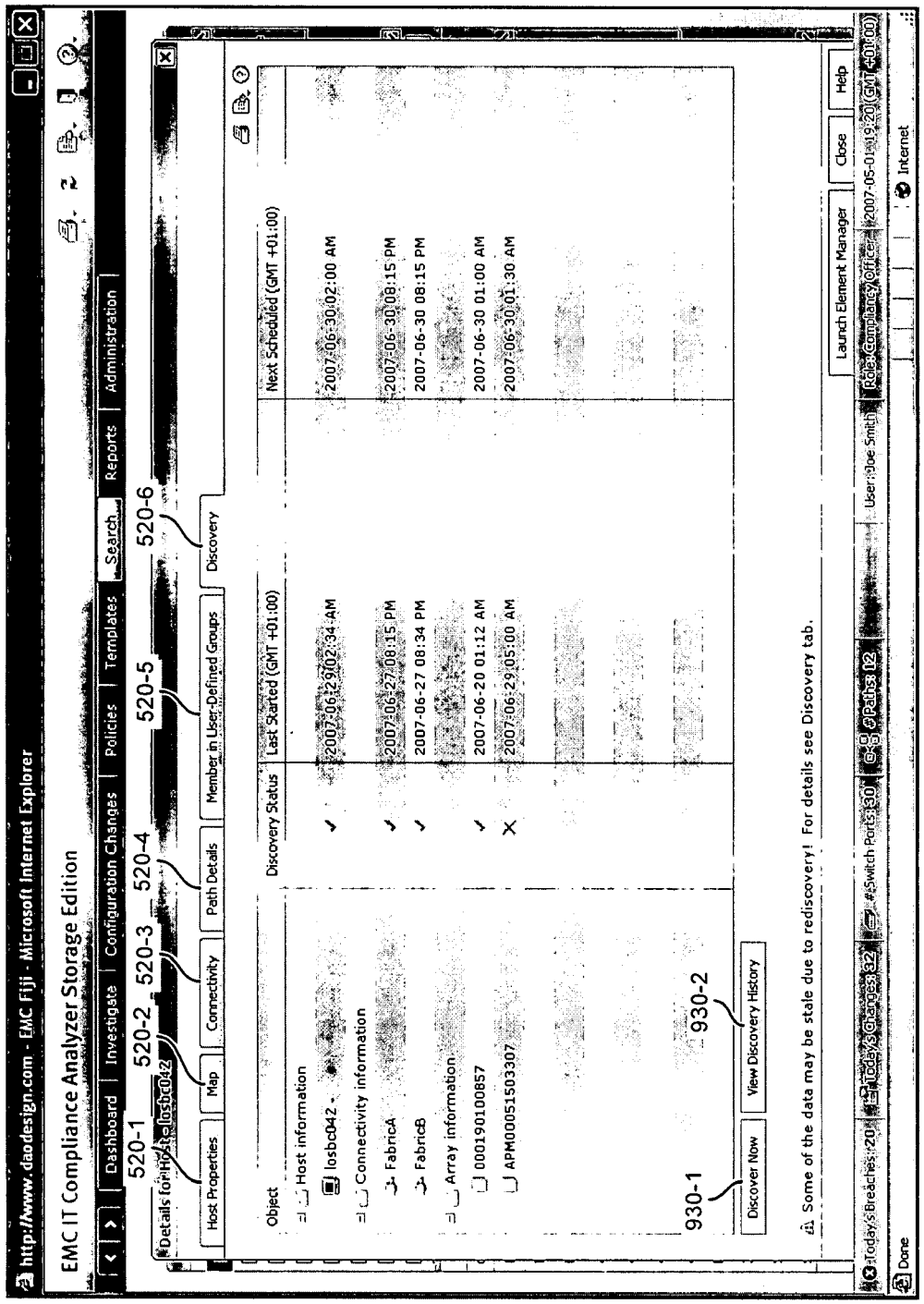

In response to selection of "discovery" viewing option 520-6 in FIG. 5, the resource manager 140 retrieves appropriate information from repository 180 and initiates display of discovery information associated with host resource LOSBC042 as shown in screenshot 900 of FIG. 9.

Figure 6:
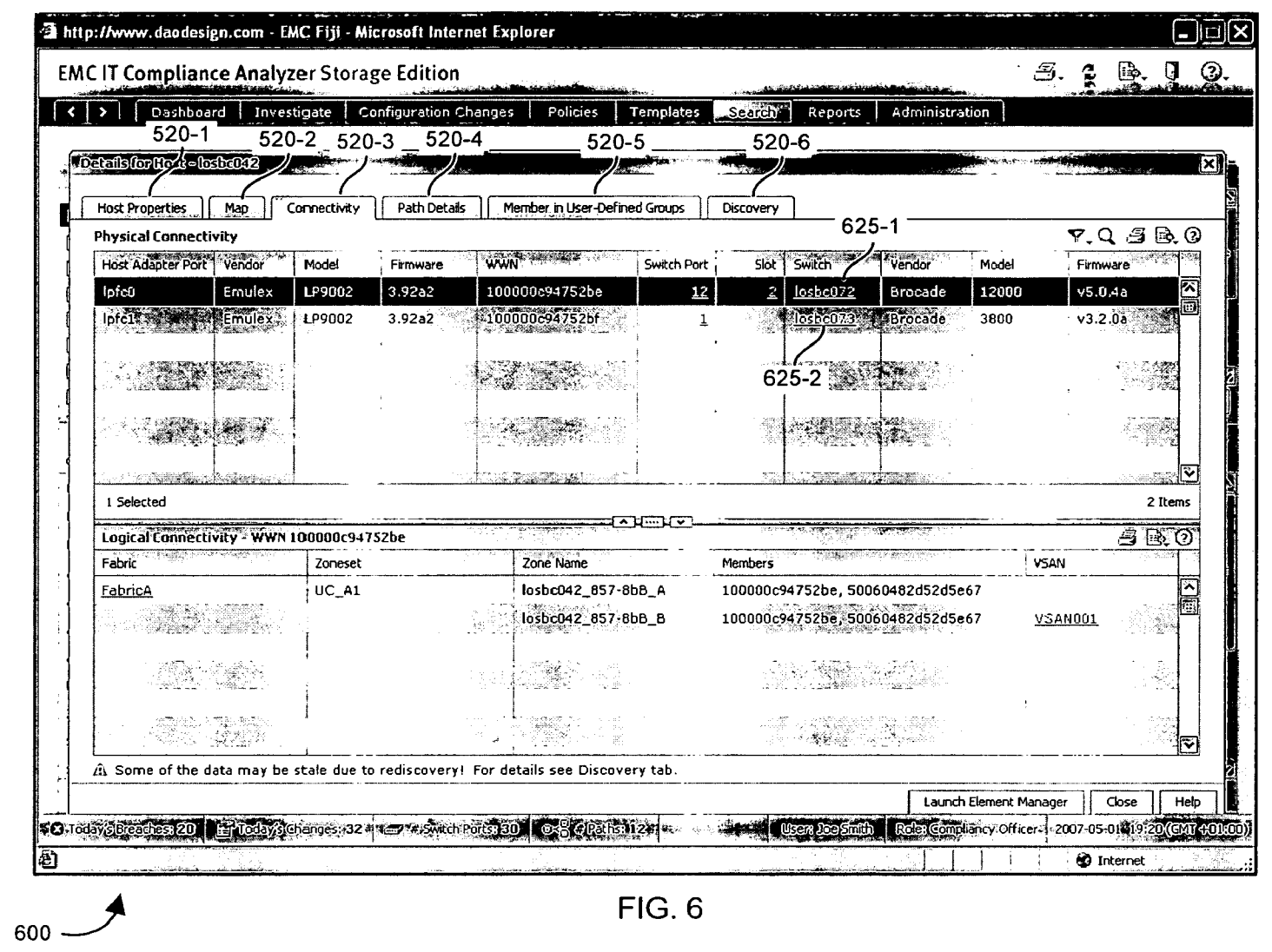

More specifically, FIG. 6 is a diagram of an example screenshot 600 illustrating "physical" connectivity information associated with host resource LOSBC042 according to embodiments herein. As shown, configuration management information in screenshot 600 includes connectivity information such as host bus adapter port information, switch port information, fabric information, zone information, etc. associated with the selected host resource. Accordingly, in response to receiving selection of a particular storage area network resource (e.g., LOSBC042 in report 425) from the plurality of storage area network resources, the resource manager 140 initiates display of configuration management information associated with the particular selected storage area network resource in screenshot 600 to illustrate a relationship of the selected storage area network resource with respect to other related storage area network resources. As previously discussed, the user 108 can select any of the viewing options 520 in the different screenshots to view different types of resource information for the selected resource.

Note that screenshot 600 can include selectable links to other resources in the storage area network environment 100 as shown. For example, screenshot 600 includes selectable link 625-1 to switch resource LOSBC072 and selectable link 625-2 to switch resource LOSBC073. Based on selection of the selectable links 625, the resource manager 140 initiates retrieval and display of information associated with the respective resources. In one embodiment, the resource manager 140 displays tabs of viewing options for selective viewing of different information associated with the selected resource in a similar manner as shown in the present disclosure for other resources.

Figure 24:
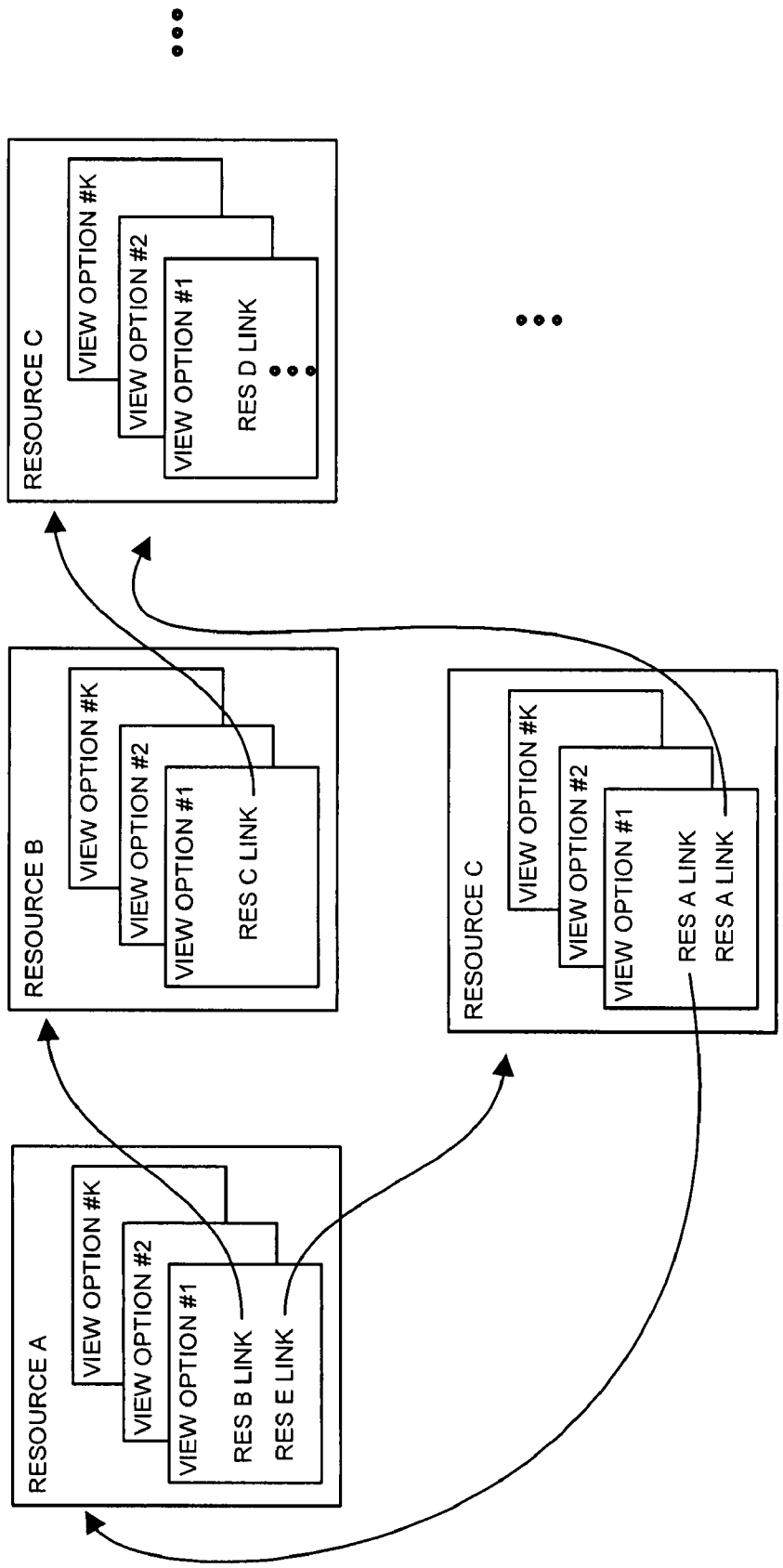
FIG. 24 is an example block diagram illustrating an interrelationship of different resources and corresponding viewing options according to embodiments herein.

FIG. 24 is an example diagram illustrating viewing options associated with different related resources according to embodiments herein. As shown, a selected resource A (from report 425) can have multiple different viewing options for viewing related information as in the screenshots of FIGS. 6-9. Within a given viewing option, the resource manager 140 can display one or more selectable links to other resources related to the resource being reviewed. Based on selection of a link to a related resource, the resource manager 140 can initiate viewing of the information associated with the related object. For example, resource A may be a host device satisfying the user's search. Selection of resource B link (in viewing option #1 of resource A) causes resource manager 140 to initiate retrieval of information associated with resource B from repository 180 for display of corresponding object information associated with resource B on display screen 130. The user can then select different viewing options for viewing information associated with resource B. Based on selection of resource C link, the user can view information associated with resource C. In this way, the user can view one resource and thereafter view information (via the selectable viewing options) associated with related resources.

FIG. 7 is a diagram of an example screenshot 700 illustrating path detail information associated with host resource LOSBC042 according to embodiments herein. As shown, screenshot 700 includes path detail information such as host device information, pseudo device information, state information, capacity information, etc. associated with the selected host resource. Accordingly, based on mere clicking of viewing option 520-4, the respective user can view path details associated with the corresponding storage area network resource (e.g., LOSBC042 in this example).

FIG. 8 is a diagram of an example screenshot 800 illustrating user defined group information associated with a selected storage area network resource (e.g., host resource LOSBC042) according to embodiments herein. As shown, user defined group information in screenshot 800 includes additional selectable links (e.g., TER_UDG) for viewing user defined group information. Accordingly, based on mere clicking of viewing option 520-5, the respective user can view user defined group information associated with the corresponding storage area network resource (e.g., LOSBC042 in this example).

FIG. 9 is a diagram of an example screenshot 900 illustrating discovery information associated with host resource LOSBC042 according to embodiments herein. As shown, screenshot 900 includes discovery information for the selected object (e.g., LOSBC042) as well as other related objects FabricA, FabricB, array 000190100857, array APM00051503307. As shown, the discovery information can include data such as discovery status information, time of last discovery for corresponding objects, time of a next scheduled discovery for the objects, etc. Accordingly, based on mere clicking of viewing option 520-6, the respective user can view discovery information associated with the corresponding storage area network resource (e.g., LOSBC042 in this example).

There may be circumstance in which a respective network administrator does not want to wait for a next scheduled discovery in order to update information associated with one or more resources presented in screenshot 900. In such a circumstance, the network administrator can select the resource or multiple resources by selecting their rows and then click on (e.g., select) display region 930-1 (e.g., "discover now" button), to initiate a new discovery with respect to a selected set including one or more resources (e.g., FabricA, FabricB, etc.).

Accordingly, in addition to initiating display of management information associated with object in report 425, embodiments herein include a resource manager 140 that initiates display of a discovery button (e.g., selectable display region 930-1) that, when selected by the user 108, causes execution of a discovery function that obtains newly discovered resource management information associated with one or more objects. After execution of the discovery function, the resource manager 140 modifies the management information currently displayed on the display screen to include or be updated in accordance with the newly discovered resource management information. Thus, the user does not need to wait for a scheduled discovery function to retrieve the most up-to-date storage area network resource information associated with the selected resource LOSBC042.

Screenshot 900 also includes a display region 930-2 for selective viewing of discovery history information. For example, in response to selection of display region 930-2, the resource manager 140 initiates display of screenshot 1000 in FIG. 10 for viewing by user 108.

Figure 10:
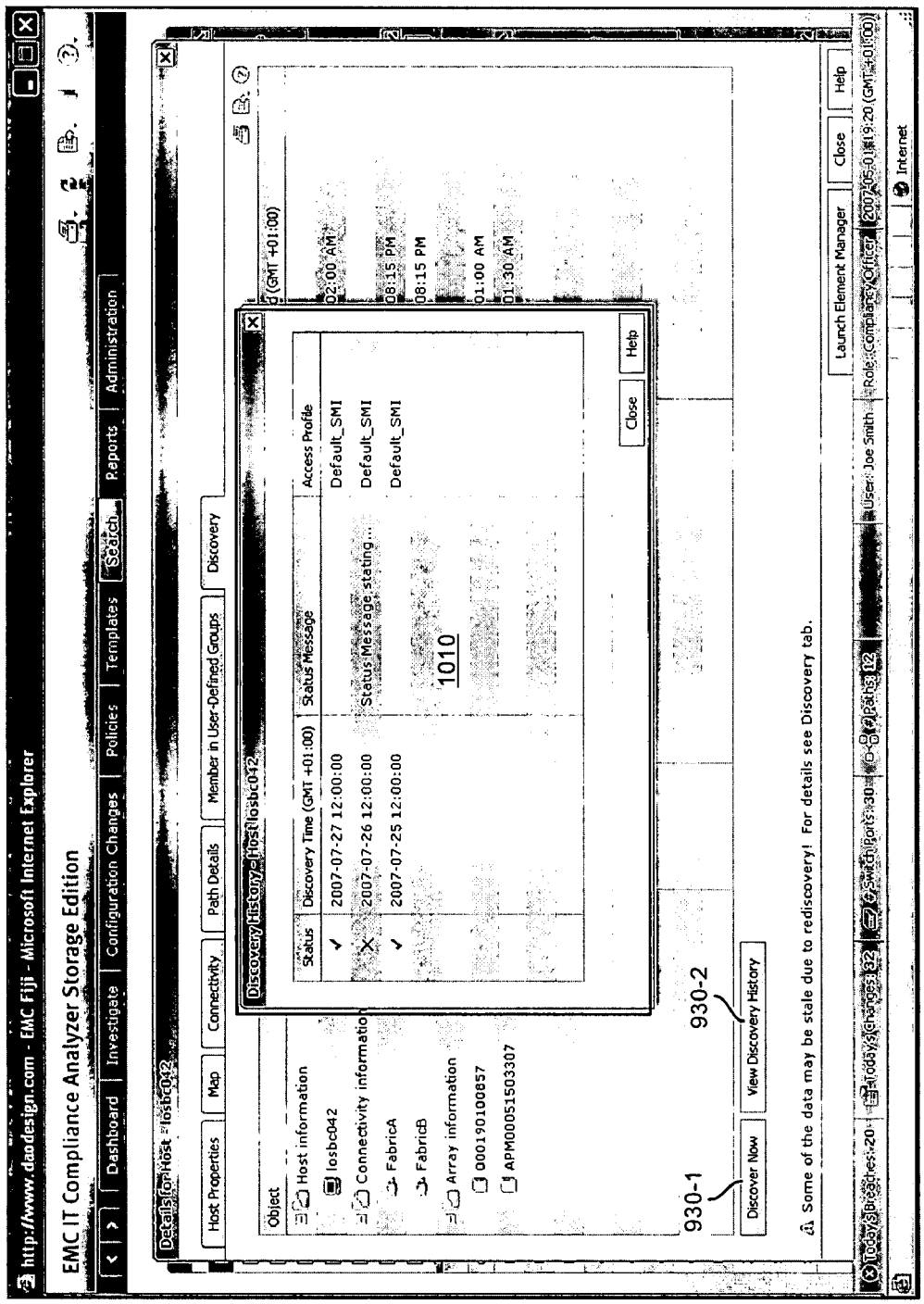
FIG. 10 is an example screenshot illustrating a display of discovery status information according to embodiments herein.

In the context of the present example, window display region 1010 of screenshot 1000 of FIG. 10 includes discovery history information associated with host resource LOSBC042. In the context of the present example, window display region 1010 includes columns of information indicating information such as a status of a discovery (e.g., pass or fail), a time when a respective discovery was attempted, status messages, and access profile information. Accordingly, a user can check an age of the discovered data displayed in the other screenshots. As previously discussed, if the last discovery was some time ago, the user 108 may decide to initiate a discovery immediately rather than wait until a next scheduled discovery is completed to update the configuration management information of interest.

Window display region 1010 (e.g., dialog box) can be closed by clicking on the "close" button.

Figure 11:
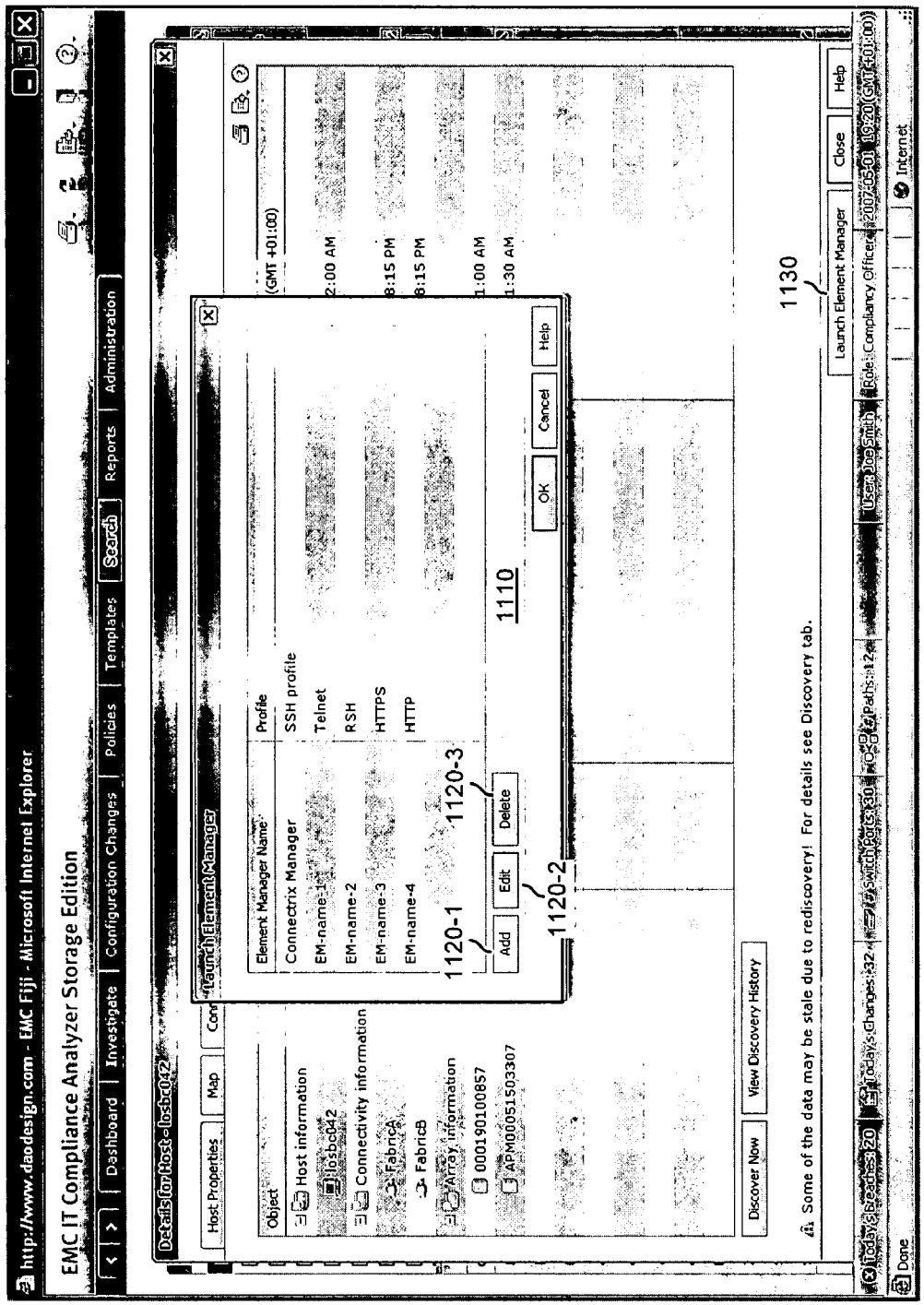
FIGS. 11 and 12 are example screenshots illustrating launching and use of an element manager according to embodiments herein.

FIG. 11 is a screenshot 1100 of graphical user interface 165 according to embodiments herein. In response to selection of display region 1130 (e.g., the button labeled launch element manager), the resource manager 140 initiates execution of an element manager application. The resource manager 140 also initiates display of window display region 1110 (e.g., a dialog box) for creating URL links to other element managers applications. As its name suggests, the element managers are external applications (some produced by EMC and some are not) that enables the user to manage (e.g., configure) the storage area network resources.

The columns in window display region 1110 includes a listing of different element manager names and corresponding profiles. The user can add, edit, and delete profiles based on selection of respective add button (e.g., display region 1120-1), edit button (e.g., display region 1120-2), and delete button (e.g., display region 1120-3).

Figure 12:
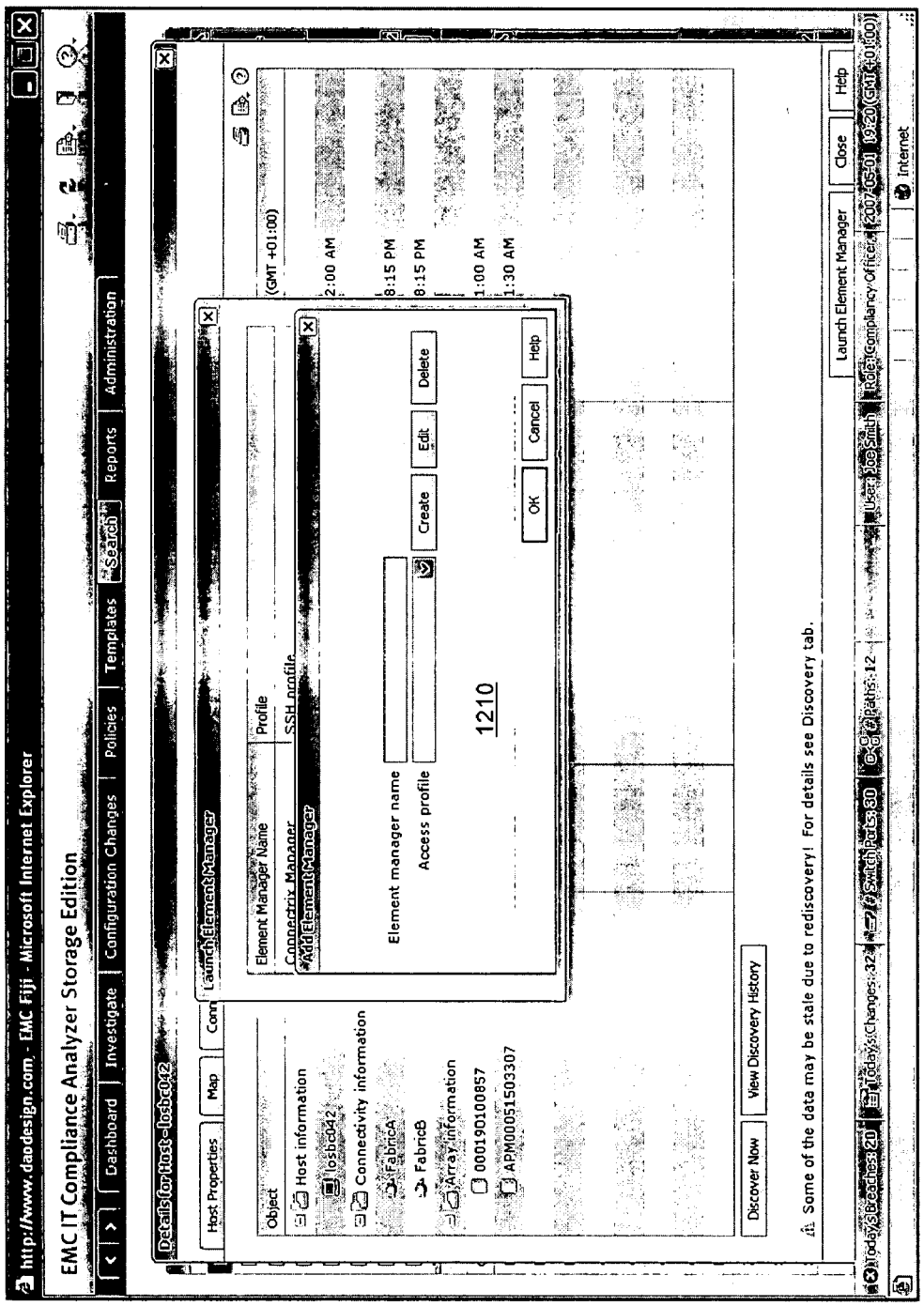

In response to selection of the add button (e.g., display region 1120-1), the element manager application initiates display of window display region 1210 as shown in screenshot 1200 of FIG. 12 for creating new element managers. Accordingly, embodiments herein include in response to receiving selection of the selectable display region, launching a resource management application that, when executed, produces a graphical user interface 165 enabling the user 108 to modify a configuration of element managers as well as manage resources present in the storage area network environment.

Figure 13:
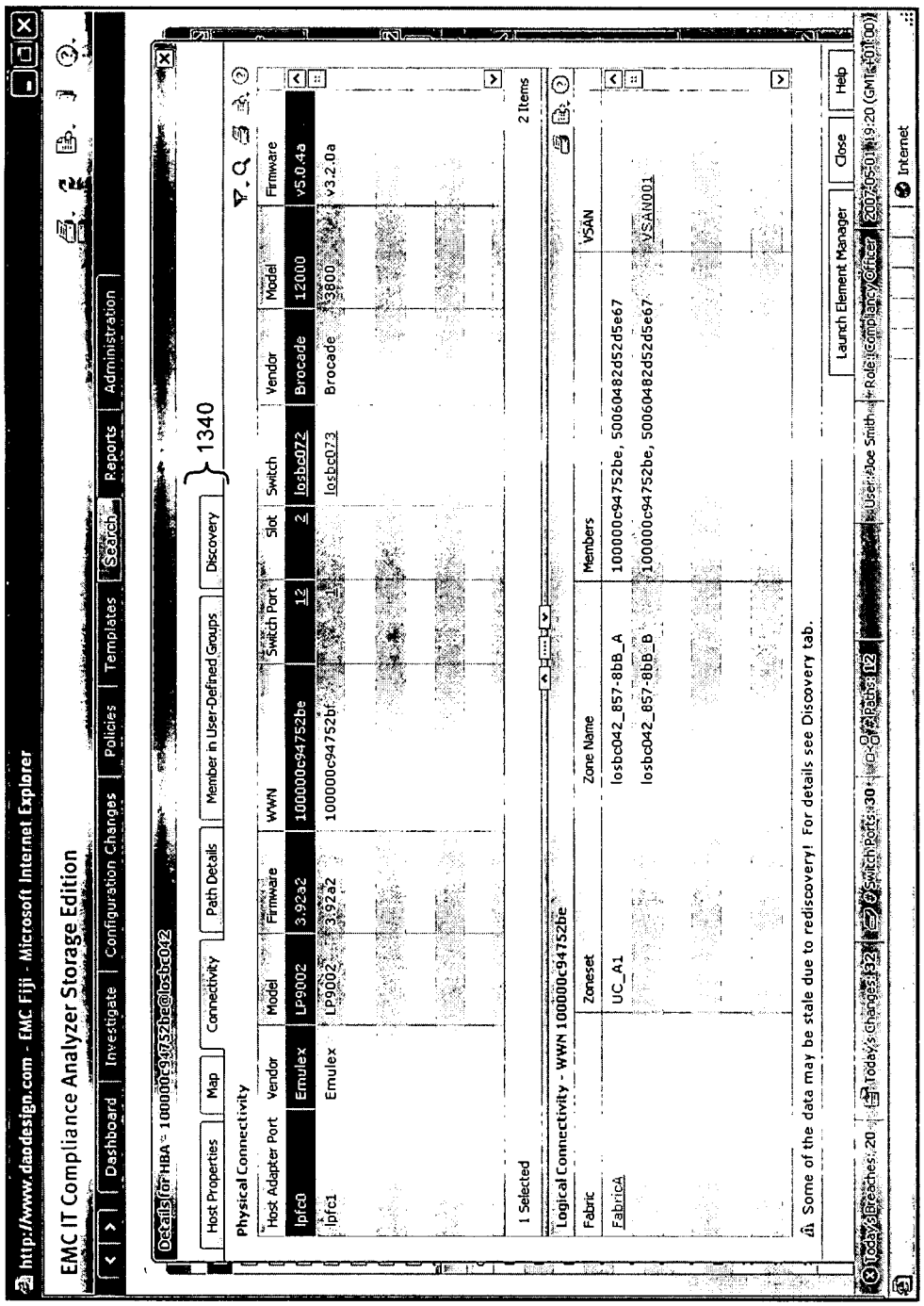

FIG. 13 is a screenshot 1300 illustrating configuration information associated with a host bus adapter resource according to embodiments herein. Resource manager 140 initiates display of screenshot 1300 in response to the user 108 selecting selectable link 442-1 in FIG. 4.

As shown in FIG. 13, the resource manager 140 displays connectivity information as a default for the multiple possible viewing options 1340 associated with the selected host bus adapter resource. However, in a similar manner as previously discussed, a respective user 108 can click the viewing option buttons 1340 to select a viewing of other storage area network resource information.

Figure 14:
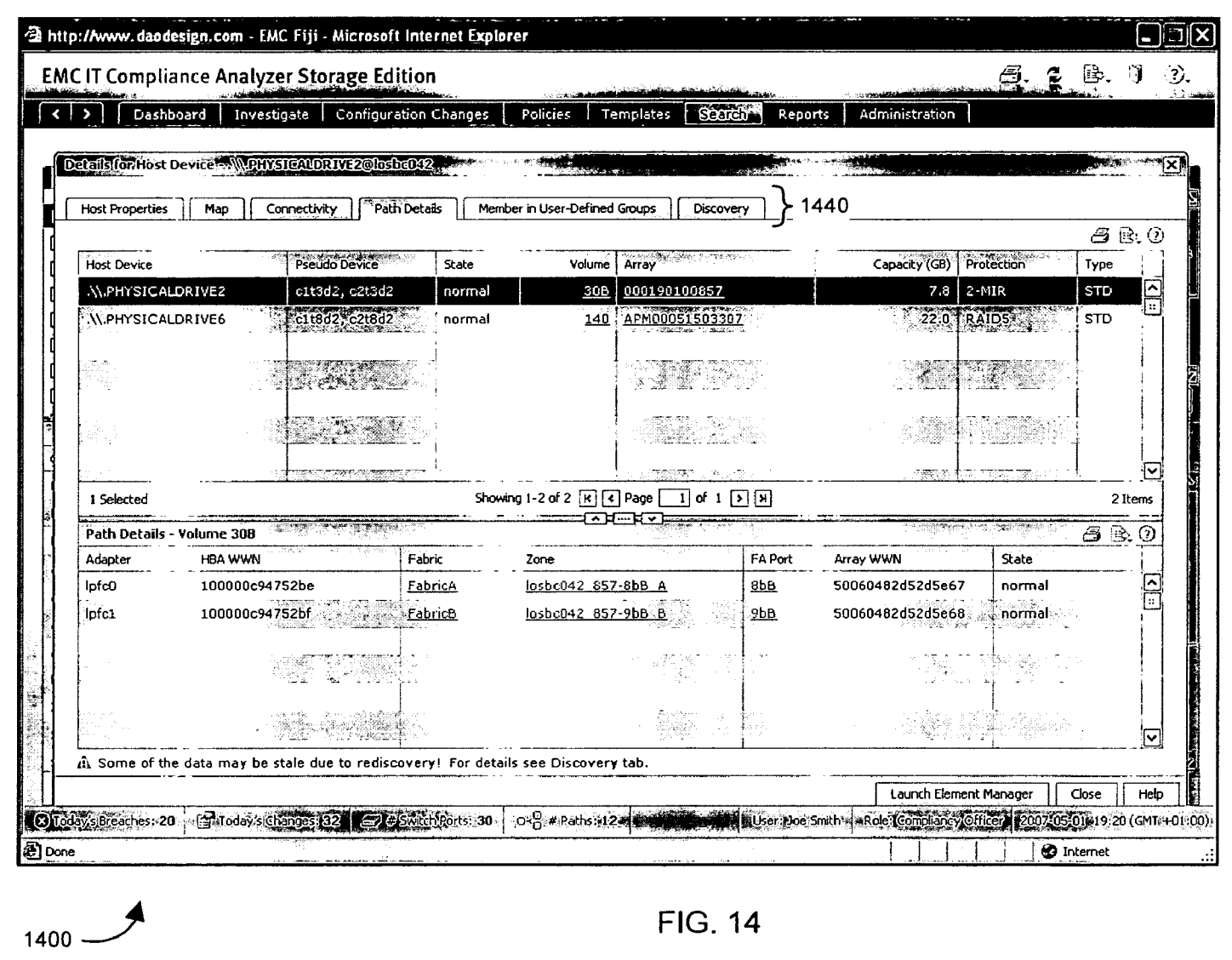

FIG. 14 is a screenshot 1400 illustrating configuration information associated with a host device according to embodiments herein. Resource manager 140 initiates display of screenshot 1400 in response to the user 108 selecting selectable link 443-1 in FIG. 4.

As shown in FIG. 14, the resource manager 140 displays path detail information as a default for the multiple possible viewing options 1440 associated with the selected host device. However, in a manner as previously discussed, a respective user 108 can click the viewing option buttons 1440 to select a viewing of other storage area network resource information.

Figure 15:
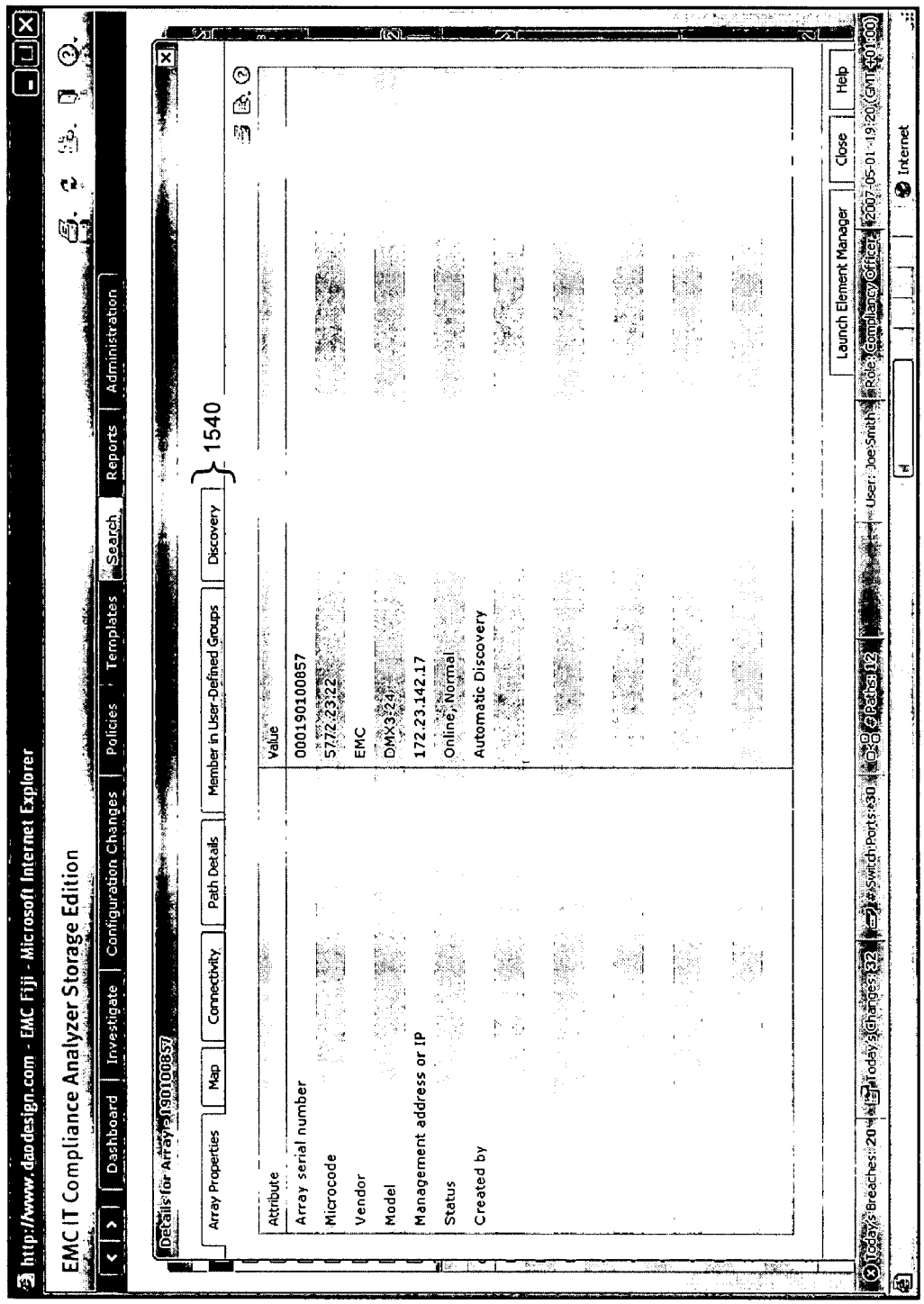

FIG. 15 is a screenshot 1500 illustrating configuration information associated with a storage array resource according to embodiments herein. Resource manager 140 initiates display of screenshot 1500 in response to the user 108 selecting selectable link 444-1 in FIG. 4.

As shown in FIG. 15, the resource manager 140 displays array property information as a default view of the multiple possible viewing options 1540 associated with the selected array resource. However, in a manner as previously discussed, a respective user 108 can click the viewing option buttons 1540 to select a viewing of other storage area network resource information. In other words, the user can select different viewing options to view information associated with the selected resource from different perspectives. For example, a user can click on a storage array-volume (device) for viewing different types of information. This (array volume) object is contained within a storage array. Therefore, the properties tab will not be opened automatically as it will show the properties of the array. Instead, the default for initially viewing information associated with a storage array volume will be a Path Details view when the user clicks on a storage volume to see its details. Thus, a default view when first displaying information associated with a selected object can vary depending on what type of resources has been selected for viewing. Of course, the user can select different viewing options as described herein to change from the default view to other views.

Figure 16:
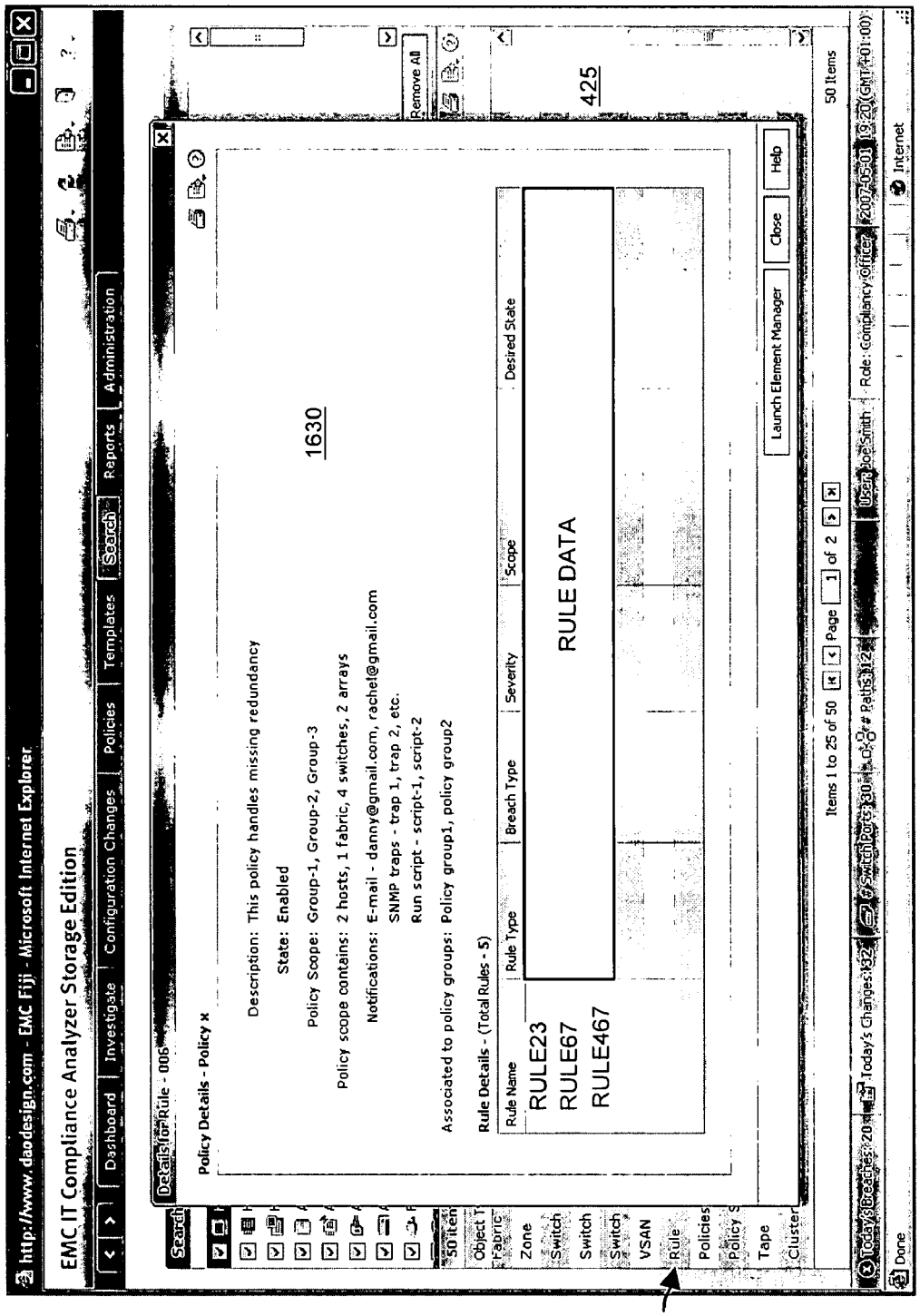

FIG. 16 is a screenshot 1600 illustrating information associated with a rule according to embodiments herein. Resource manager 140 initiates display of screenshot 1600 in response to the user 108 making selection of a selectable link (e.g., resource) in rule object type 1605 of the search report 425.

Resource manager 140 initiates display of window region 1630 in screenshot 1600 for presenting rule information associated with the selected rule. In the context of the present example, the resource manager 140 initiates display of rule information such as a description of the rules and/or corresponding policy, state of a rule, policy or rule scope, resources in the policy or rule scope, modes for providing notification when the policy or rule is violated, etc.

In columnar form, the resource manager 140 displays rule information (e.g., rule details) such as names of rules, types associated with the rules, breach types, severity of the breach, scope of the rules, and desired states of the rules. Thus, based on viewing of information in window region 1630, the user 108 can quickly identify attributes of the one or more rules and respective violations.

Figure 17:
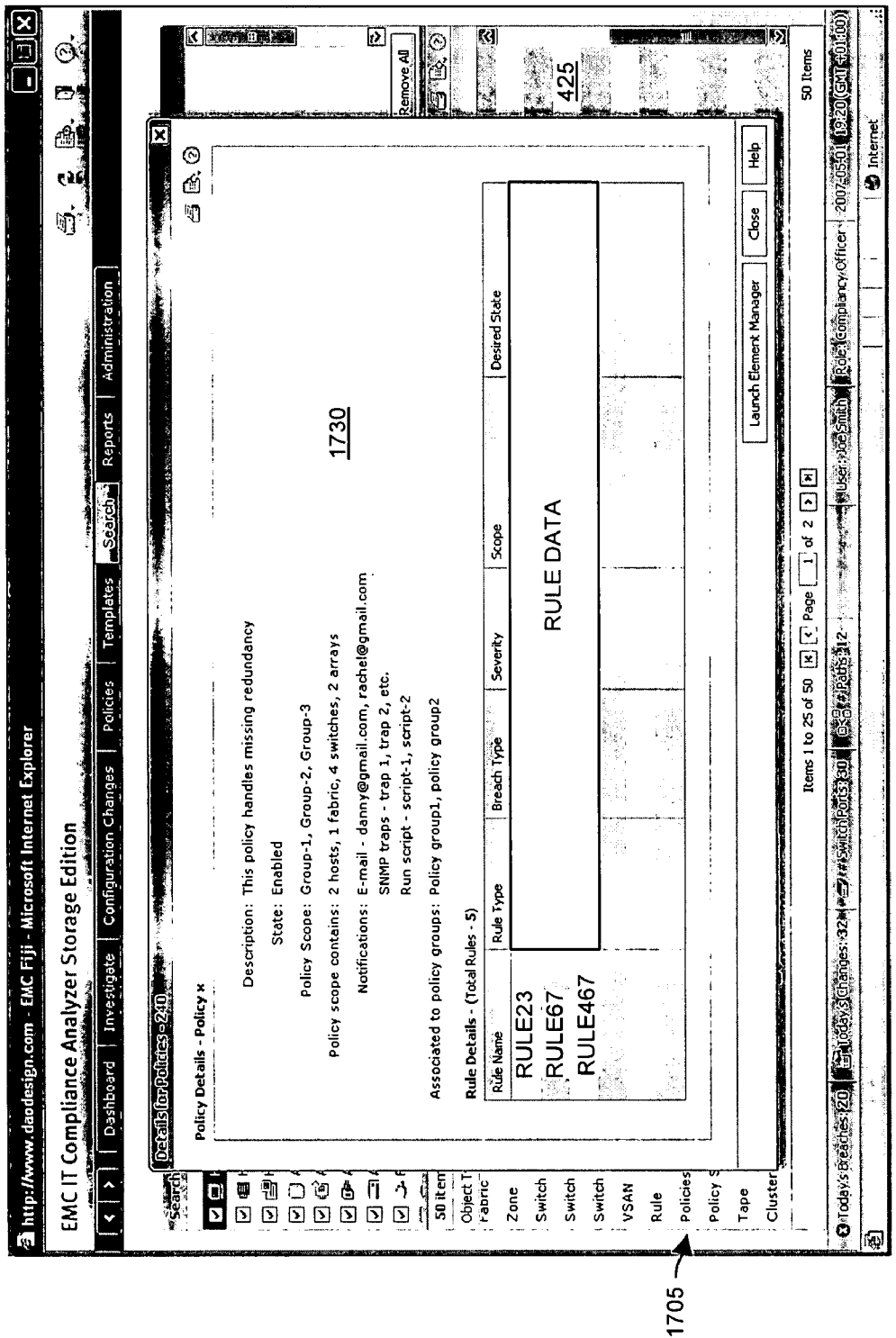

FIG. 17 is a screenshot 1700 illustrating configuration information associated with a policy and corresponding rules according to embodiments herein. Resource manager 140 initiates display of screenshot 1700 in response to the user 108 selecting a selectable link for a respective policy type 1705 object (e.g., a policy) displayed in the search report 425. In general, screenshot 1700 includes window region 1730 for displaying the same information as displayed in window region 1630 of screenshot 1600 as discussed above.

Figure 18:
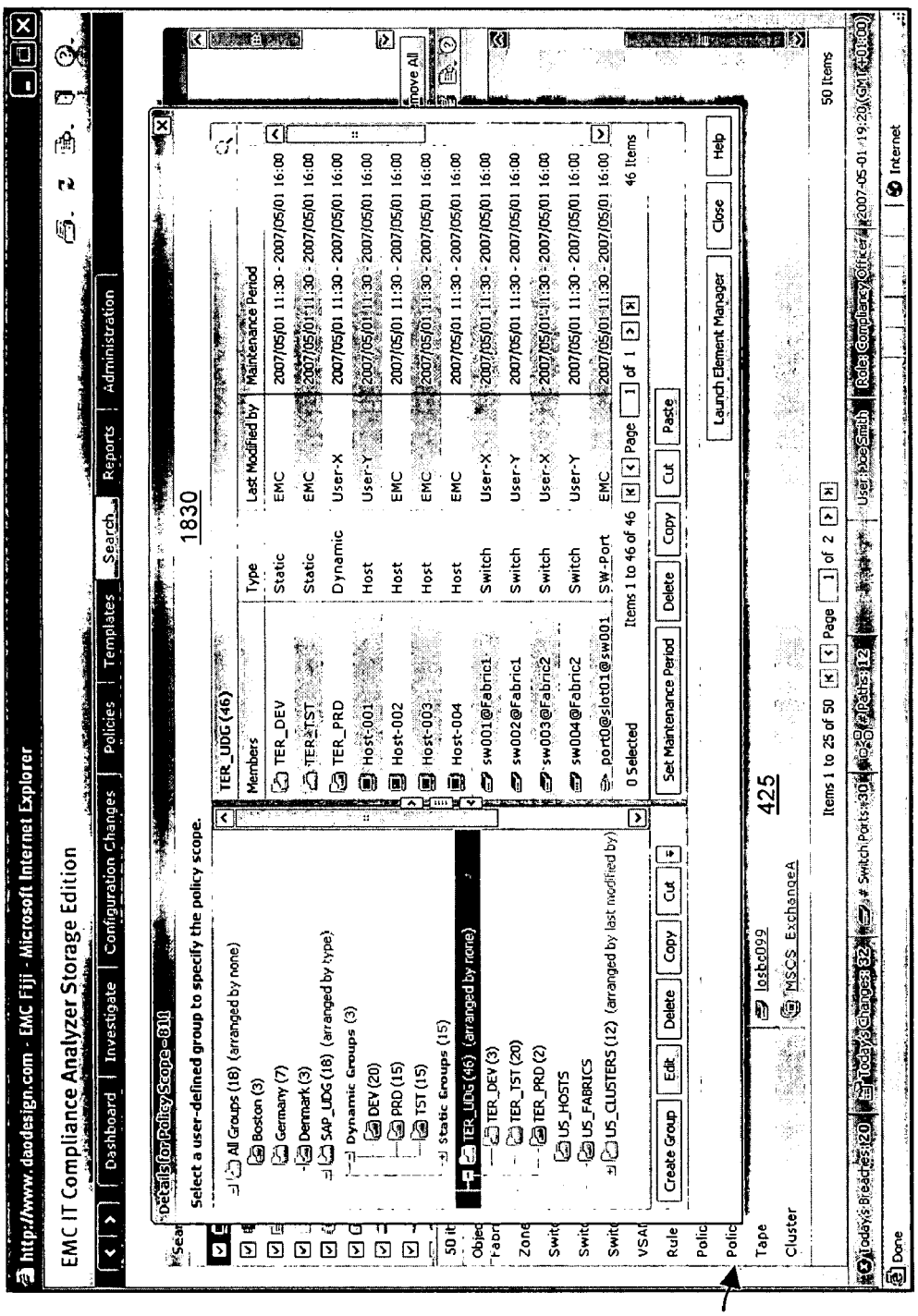

FIG. 18 is a screenshot 1800 illustrating configuration information associated with policy scope according to embodiments herein. In a similar manner as previously discussed, resource manager 140 initiates display of screenshot 1800 in response to the user 108 selecting a selectable link for policy scope object type 1805 as displayed in the search report 425. In general, window region 1830 includes detailed information with respect to a corresponding policy scope.

Figure 19:
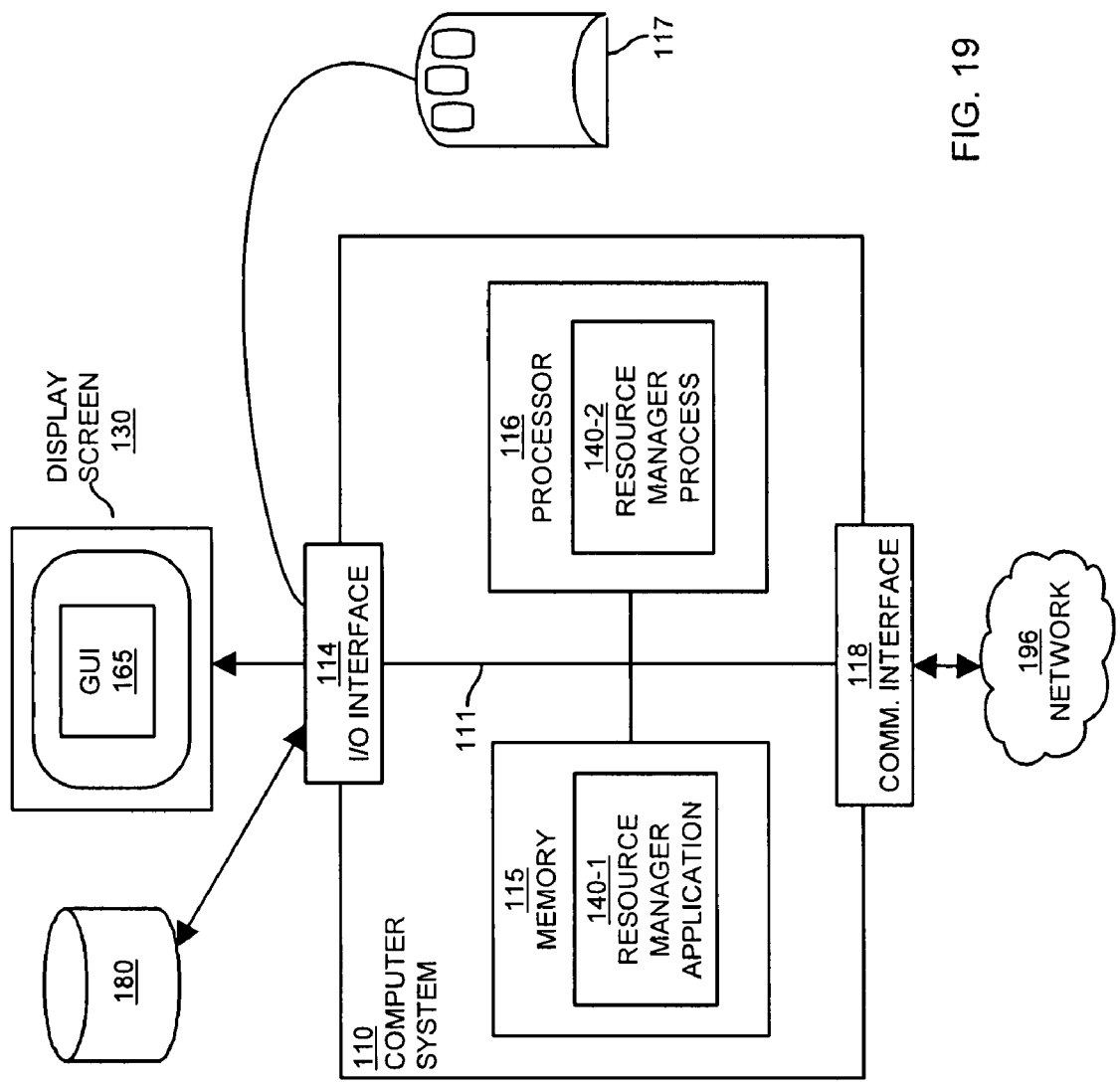
FIG. 19 is an example block diagram of a computer system suitable for executing a respective resource manager according to embodiments herein.

FIG. 19 is a block diagram illustrating an example computer system 110 for executing resource manager 140 and related functions/processes according to embodiments herein. Computer system 110 may be a computerized device such as a personal computer, workstation, portable computing device, console, network terminal, processing device, etc.

As shown, computer system 110 of the present example includes an interconnect 114 that couples a memory system 115, a processor 116, an I/O interface 114, and a communications interface 118. I/O interface 114 enables computer system 110 to carry out object type searches (based on input from hand operated device 117 such as a keyboard, computer mouse, etc.) and display storage area network resource information on graphical user interface 165 of display screen 130. Communications interface 114 enables computer system 110 to communicate over network 196 to transmit and receive information from different resources as is needed to carry out searching and display of information according to embodiments herein.

As shown, memory system 115 is encoded with resource manager application 140-1 supporting resource management and other related functions according to embodiments herein. Resource manager application 140-1 can be embodied as software code such as data and/or logic instructions (e.g., code stored in the memory or on another computer readable medium such as a disk) that support functionality according to different embodiments described herein.

Note that other functionality associated with resource manager 140 as described herein also can be encoded as software that operates on a computer system 110 or the like to carry out embodiments herein.

Referring again to the resource manager 140 example, during operation of resource manager application 140-1, processor 116 accesses memory system 115 via the interconnect 111 in order to launch, run, execute, interpret or otherwise perform the logic instructions of the resource manager application 140-1. Execution of the resource manager application 140-1 produces processing functionality in resource manager process 140-2. In other words, the resource manager process 140-2 represents one or more portions of the resource manager 140 (or the entire application) performing within or upon the processor 116 in the computer system 110.

It should be noted that resource manager process 140-2 executed in computer system 110 can be represented by either one or both of the resource manager application 140-1 and/or the resource manager process 140-2. For purposes of this discussion and different embodiments herein, general reference will again be made to the resource manager 140 as performing or supporting the various steps and functional operations as previously discussed and as will be discussed further in this specification.

As mentioned, note that in addition to the resource manager process 140-2, embodiments herein include the resource manager application 140-1 itself (i.e., the un-executed or non-performing logic instructions and/or data). The resource manager application 140-1 may be stored on a tangible computer readable medium such as a floppy disk, hard disk, or optical medium. The resource manager application 140-1 may also be stored in a memory type system such as in firmware, read only memory (ROM), or, as in this example, as executable code within the memory system 115 (e.g., within Random Access Memory or RAM).

In addition to these embodiments, it should also be noted that other embodiments herein include the execution of resource manager application 140-1 in processor 116 as the resource manager process 140-2. Thus, those skilled in the art will understand that the computer system 110 may include other processes and/or software and hardware components, such as an operating system that controls reservation and use of hardware resources.

Functionality supported by resource manager 140 and other related functions will now be discussed via flowcharts in FIGS. 20-23.

Figure 20:
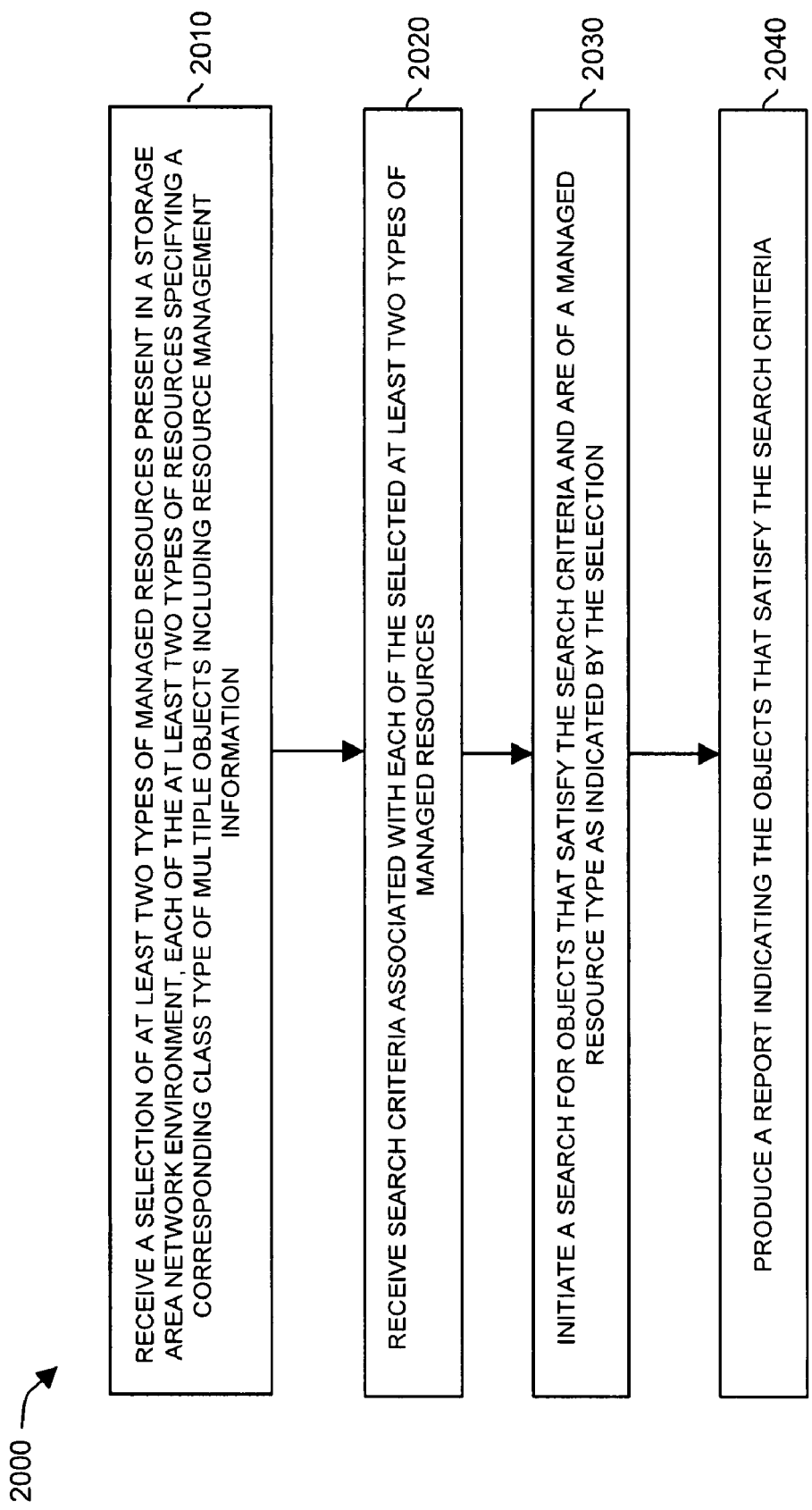
FIG. 20 is an example flowchart illustrating a method supporting searching and viewing of storage area network resource information according to embodiments herein.

Now, more particularly, FIG. 20 is a flowchart 2000 illustrating a technique of producing search reports and providing different options for viewing storage area network resource information according to embodiments herein. Note that techniques discussed in flowchart 2000 may overlap with the techniques discussed above.

In step 2010, resource manager 140 receives a selection in listing 245 of at least two types of managed resources (e.g., resource types 210) present in a storage area network environment 100. Each of the at least two selected resource types 210 specify a corresponding class type of objects 182 in repository 180. As previously discussed, each object stores information (e.g., management information) associated with a corresponding storage area network resource in storage area network 190.

In step 2020, resource manager 140 receives search criteria 220 associated with each of the selected at least two types of managed resources from listing 245.

In step 2030, resource manager 140 initiates a search for objects 182 in repository 180 that satisfy the search criteria 220 and are of a managed resource type as indicated by the selection.

In step 2040, resource manager 140 produces a report 425 indicating the objects 182 in repository 180 that satisfy the search criteria 220.

Figure 21:
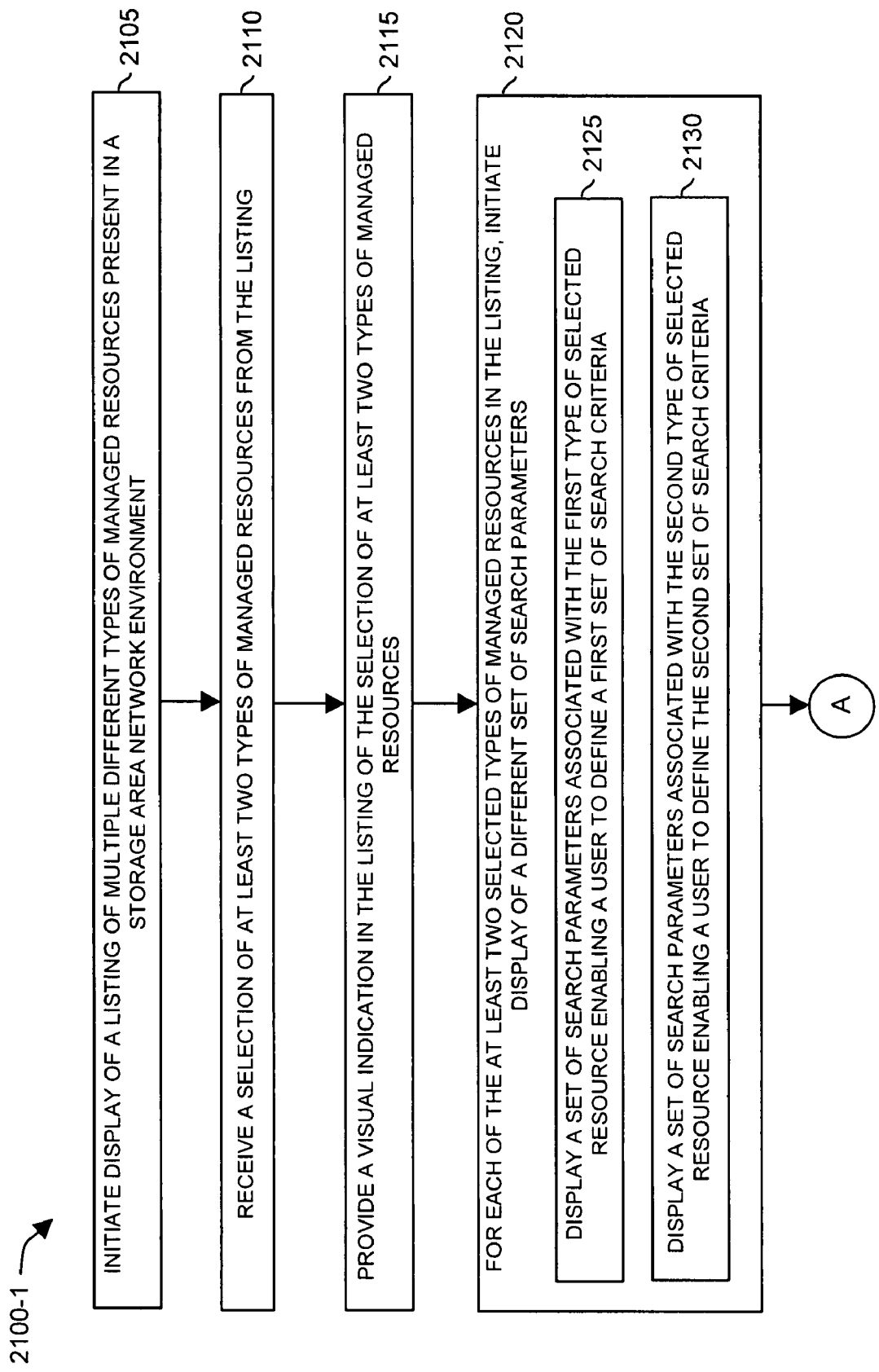
FIGS. 21, 22, and 23 combine to form an example flowchart illustrating a method supporting searching and viewing of storage area network resource information according to embodiments herein.
Figure 22:
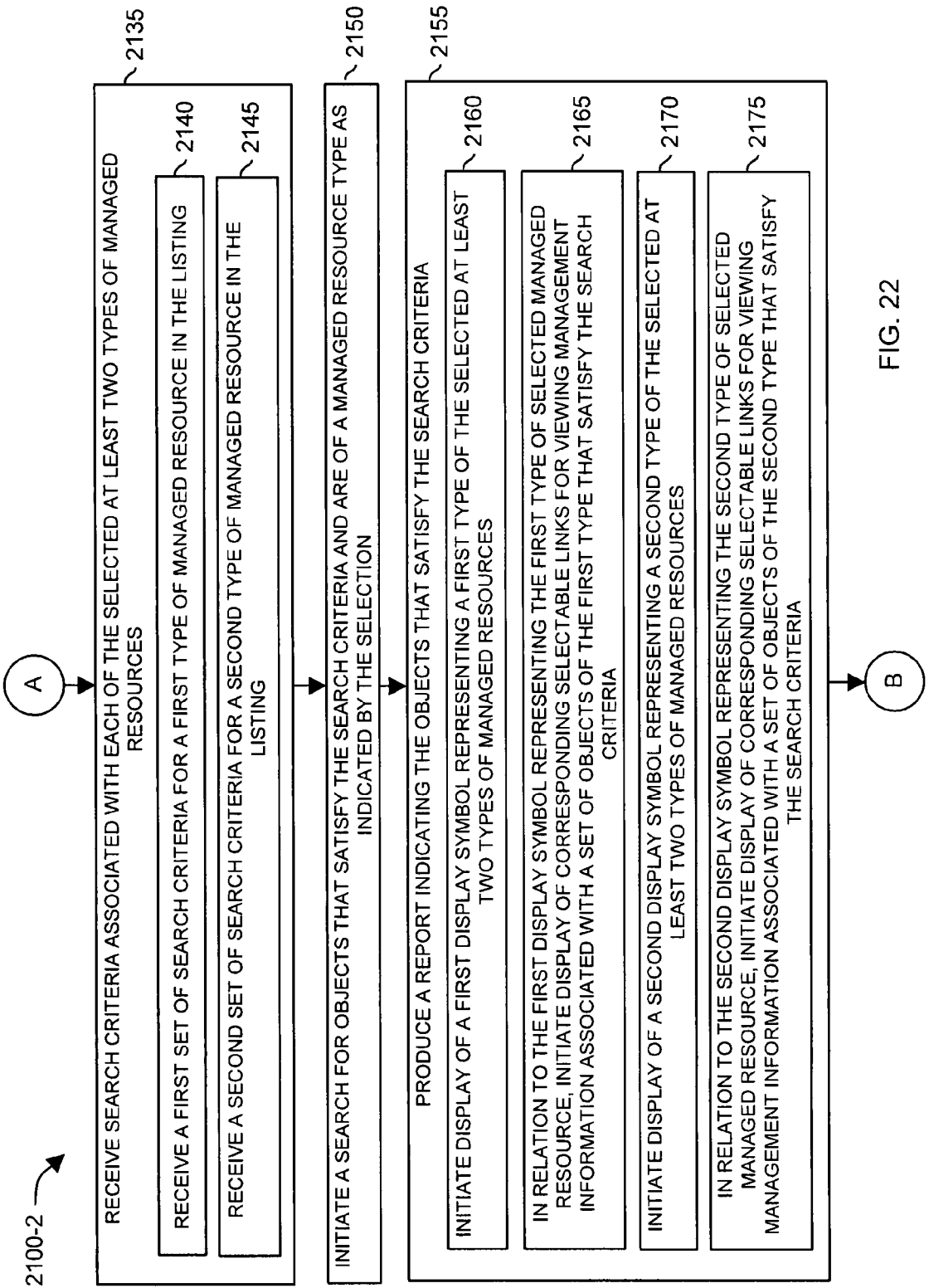
Figure 23:
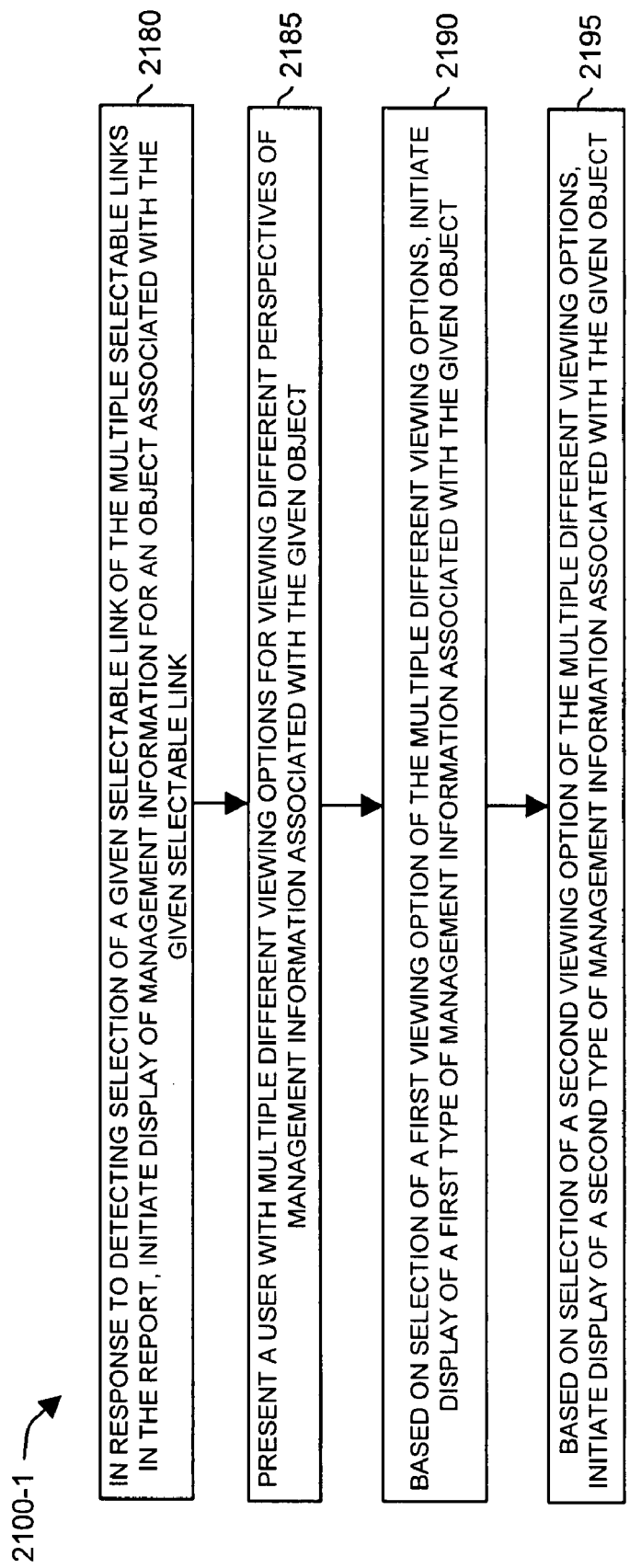

FIGS. 21-23 combine to form a detailed flowchart 2100 (e.g., flowchart 2100-1, flowchart 210-2, and flowchart 2100-3) illustrating techniques for resource management according to embodiments herein. Note that techniques discussed in flowchart 2100 also overlap with the techniques discussed above.

In step 2105, resource manager 140 initiates display of a listing 245 of multiple different types of managed resources (e.g., resource types 210) present in a storage area network environment 100.

In step 2110, resource manager 140 receives a selection of at least two types of managed resources from the listing 245.

In step 2115, resource manager 140 provides a visual indication in the listing 245 of the selection of at least two types of managed resources.

In step 2120, for each of the at least two selected types of managed resources in the listing 245, resource manager 140 initiates display of a different set of search parameters in accordance with the resource type 210 selected.

In sub-step 2125, resource manager 140 displays a set of search parameters associated with the first type of selected resource from listing 245. This enables the user 108 to define search criteria for the first resource type.

In sub-step 2130, resource manager 140 displays a set of search parameters associated with the second type of selected resource from listing 245. This enables a user 108 to define search criteria for the second resource type.

In step 2135, resource manager 140 receives the search criteria associated with each of the selected resource types.

In sub-step 2140, resource manager 140 receives the first set of search criteria for the first resource type selected from the listing 245.

In sub-step 2145, resource manager 140 receives the second set of search criteria for the second resource type selected from the listing 245.

In step 2150, resource manager 140 initiates a search for objects in repository 180 that satisfy the search criteria and are of a managed resource type as indicated by the selection.

In step 2155, resource manager 140 produces a report 425 indicating the objects 182 that satisfy the search criteria.

In sub-step 2160, resource manager 140 initiate display of a first display symbol 415 representing a first type of the selected at least two types of managed resources In sub-step 2165, in relation to the first display symbol representing the first type of selected managed resource, resource manager 140 initiates display of corresponding selectable links 440 for viewing management information associated with a set of objects of the first type that satisfy the search criteria.

In sub-step 2170, resource manager 140 initiates display of a second display symbol 415 representing a second type of the selected at least two types of managed resources.

In sub-step 2175, in relation to the second display symbol representing the second type of selected managed resource, resource manager 140 initiates display of corresponding selectable links 440 for viewing management information associated with a set of objects of the second type that satisfy the search criteria.

In step 2180, in response to detecting selection of a given selectable link of the multiple selectable links in the report 425, resource manager 140 initiates display of management information for an object associated with the given selectable link.

In step 2185, resource manager 140 presents a user with multiple different viewing options for viewing different perspectives of management information associated with the given object.

In step 2190, based on selection of a first viewing option of the multiple different viewing options 520, resource manager 140 initiates display of a first type of management information associated with the given object In step 2195, based on selection of a second viewing option of the multiple different viewing options 520, resource manager 140 initiates display of a second type of management information associated with the given object, and so on.

As discussed above, techniques herein are well suited for use in an environment (e.g., storage area network environments) including multiple storage area network resources managed by a respective user such as a network administrator. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

What is claimed is:

1. A method comprising:
    receiving selection of at least two types of managed resources present in a storage area network environment, each of the at least two types of resources specifying a corresponding class type of multiple objects including resource management information;
    receiving search criteria associated with each of the selected at least two types of managed resources;
    initiating a search for objects that satisfy the search criteria and are of a managed resource type as indicated by the selection; and
    producing a report indicating the objects that satisfy the search criteria, the method further comprising:
    initiating display of a listing of multiple different types of managed resources present in the storage area network environment, the multiple different types of managed resources including the selected at least two types of managed resources as well as other non-selected types of managed resources;
    providing a visual indication in the listing, the visual indication indicating the selection;
    for each of the at least two selected types of managed resources in the listing, initiating display of a different set of search parameters; and
    wherein receiving the search criteria includes:
    receiving a first set of search criteria for a first type of managed resource in the listing, and
    receiving a second set of search criteria for a second type of managed resource in the listing;
    wherein initiating display of the different set of search parameters for a respective type of selected managed resource in the listing includes:
    for a first time duration: while highlighting the selection of the first type of managed resource in the listing, displaying a set of search parameters associated with the first type of selected resource enabling a user to define the first set of search criteria; and
    for a subsequent time duration after the first time duration: while highlighting the selection of the second type of managed resource in the listing, displaying a set of search parameters associated with the second type of selected resource enabling a user to define the second set of search criteria.

2. A method as in claim 1, wherein producing the report includes:
    initiating display of a first display symbol representing a first type of the selected at least two types of managed resources;
    in relation to the first display symbol representing the first type of selected managed resource, initiating display of corresponding selectable links for viewing management information associated with a set of objects of the first type that satisfy the search criteria;
    initiating display of a second display symbol representing a second type of the selected at least two types of managed resources; and
    in relation to the second display symbol representing the second type of selected managed resource, initiating display of corresponding selectable links for viewing management information associated with a set of objects of the second type that satisfy the search criteria.

3. A method as in claim 1 further comprising:
    based on receiving selection of a given object from the objects indicated in the report, presenting a user with multiple different viewing options for viewing different perspectives of management information associated with the given object.

4. A method as in claim 3 further comprising:
based on selection of a first viewing option of the multiple different viewing options, initiating display of a first type of management information associated with the given object; and
based on selection of a second viewing option of the multiple different viewing options, initiating display of a second type of management information associated with the given object.

5. A method as in claim 3 further comprising:
in addition to initiating display of management information associated with the given object indicated in the report, initiating display of a discovery button that, when selected by the user, causes execution of a discovery function for obtaining newly discovered resource management information associated with the given object; and
in response to execution of the discovery function based on selection of the discovery button by the user, modifying the management information displayed on the display screen to include the newly discovered resource management information.

6. A method as in claim 3 further comprising:
in at least one of the multiple different viewing options, presenting a selectable display region;
in response to receiving selection of the selectable display region, launching a resource management application that, when executed, produces a graphical user interface enabling the user to modify a configuration of the managed resources present in the storage area network environment.

7. A method as in claim 6, wherein producing the report includes initiating display of identities of a plurality of storage area network resources in the storage area network environment that that satisfy the search criteria and are of a managed resource type as indicated by the selection, the method further comprising:
in response to receiving selection of a particular storage area network resource from the plurality of storage area network resources, initiating display of management information associated with the particular storage area network resource to illustrate a relationship of the particular storage area network resource with respect to other related storage area network resources in the storage area network environment.

8. The method as in claim 1, wherein the search criteria includes a first set of search parameters and a second set of search parameters, the first set of search parameters associated with the first type of managed resource, the second set of search parameters associated with the second type of managed resource, the first set of search parameters being unique in comparison to the second set of search parameters.

9. The method as in claim 8, wherein receiving the selection includes receiving selection of at least a first type of managed resource and a second type of managed resource; and
wherein producing the report includes:
initiating display of identities of multiple different objects that are of the first type of managed resource and that satisfy the search criteria;
initiating display of identities of multiple different objects that are of the second type of managed resource and that satisfy the search criteria.

10. The method as in claim 9 further comprising:
based on receiving selection of a given object from the objects indicated in the report, presenting a user with multiple different viewing options for viewing different perspectives of management information associated with the given object;
in addition to initiating display of management information associated with the given object indicated in the report, initiating display of a discovery button that, when selected by the user, causes execution of a discovery function for obtaining newly discovered resource management information associated with the given object;
in response to receiving selection of the discovery button, initiating execution of the discovery function prior to a next scheduled discovery for the given object; and
in response to execution of the discovery function, modifying the management information displayed on a display screen to display most up-to-date resource management information associated with the given object.

11. A computer system comprising:
at least one processor;
a memory unit that stores instructions associated with an application executed by the at least one processor; and
an interconnect coupling the at least one processor and the memory unit, enabling the computer system to execute the application and perform operations of:
receiving selection of at least two types of managed resources present in a storage area network environment, each of the at least two types of resources specifying a corresponding class type of multiple objects including resource management information;
receiving search criteria associated with each of the selected at least two types of managed resources;
initiating a search for objects that satisfy the search criteria and are of a managed resource type as indicated by the selection;
producing a report indicating the objects that satisfy the search criteria;
initiating display of a listing of multiple different types of managed resources present in the storage area network environment, the multiple different types of managed resources including the selected at least two types of managed resources as well as other non-selected types of managed resources;
providing a visual indication in the listing, the visual indication indicating the selection;
for each of the at least two selected types of managed resources in the listing, initiating display of a different set of search parameters; and
wherein receiving the search criteria includes:
receiving a first set of search criteria for a first type of managed resource in the listing, and
receiving a second set of search criteria for a second type of managed resource in the listing;
wherein initiating display of the different set of search parameters for a respective type of selected managed resource in the listing includes:
for a first time duration: while highlighting the selection of the first type of managed resource in the listing, displaying a set of search parameters associated with the first type of selected resource enabling a user to define the first set of search criteria; and
for a subsequent time duration after the first time duration: while highlighting the selection of the second type of managed resource in the listing, displaying a set of search parameters associated with the second type of selected resource enabling a user to define the second set of search criteria.

12. A computer system as in claim 11 further supporting operations of:
   initiating display of a listing of multiple different types of managed resources present in the storage area network environment, the multiple different types of managed resources including the selected at least two types of managed resources as well as other non-selected types of managed resources;
   providing a visual indication in the listing, the visual indication indicating the selection;
   for each of the at least two selected types of managed resources in the listing, initiating display of a different set of search parameters; and
   wherein receiving the search criteria includes:
      receiving a first set of search criteria for a first type of managed resource in the listing, and
      receiving a second set of search criteria for a second type of managed resource in the listing.

13. A computer system as in claim 12, wherein initiating display of the different set of search parameters for a respective type of selected managed resource in the listing includes:
   for a first time duration: while highlighting the selection of the first type of managed resource in the listing, displaying a set of search parameters associated with the first type of selected resource enabling a user to define the first set of search criteria; and
   for a subsequent time duration after the first time duration: while highlighting the selection of the second type of managed resource in the listing, displaying a set of search parameters associated with the second type of selected resource enabling a user to define the second set of search criteria.

14. A computer system as in claim 11, wherein producing the report includes:
   initiating display of a first display symbol representing a first type of the selected at least two types of managed resources;
   in relation to the first display symbol representing the first type of selected managed resource, initiating display of corresponding selectable links for viewing management information associated with a set of objects of the first type that satisfy the search criteria;
   initiating display of a second display symbol representing a second type of the selected at least two types of managed resources; and
   in relation to the second display symbol representing the second type of selected managed resource, initiating display of corresponding selectable links for viewing management information associated with a set of objects of the second type that satisfy the search criteria.

15. A computer system as in claim 11, wherein producing the report includes displaying multiple selectable links for viewing management information associated with the objects indicated in the report that satisfy the search criteria, the computer system further supporting operations of:
   in response to detecting selection of a given selectable link of the multiple selectable links in the report, initiating display of management information for an object associated with the given selectable link.

16. A computer system as in claim 11 further supporting operations of:
   based on receiving selection of a given object from the objects indicated in the report, presenting a user with multiple different viewing options for viewing different perspectives of management information associated with the given object;
   based on selection of a first viewing option of the multiple different viewing options, initiating display of a first type of management information associated with the given object; and
   based on selection of a second viewing option of the multiple different viewing options, initiating display of a second type of management information associated with the given object.

17. Software encoded on one or more computer-readable storage media, when executed, the software operable to:
   receive selection of at least two types of managed resources present in a storage area network environment, each of the at least two types of resources specifying a corresponding class type of multiple objects including resource management information;
   receive search criteria associated with each of the selected at least two types of managed resources;
   initiate a search for objects that satisfy the search criteria and are of a managed resource type as indicated by the selection; and
   produce a report indicating the objects that satisfy the search criteria;
   initiate display of a listing of multiple different types of managed resources present in the storage area network environment, the multiple different types of managed resources including the selected at least two types of managed resources as well as other non-selected types of managed resources;
   provide a visual indication in the listing, the visual indication indicating the selection;
   for each of the at least two selected types of managed resources in the listing, initiate display of a different set of search parameters; and
   wherein receiving the search criteria includes:
      receive a first set of search criteria for a first type of managed resource in the listing, and
      receive a second set of search criteria for a second type of managed resource in the listing;
   wherein initiating display of the different set of search parameters for a respective type of selected managed resource in the listing includes:
      for a first time duration: while highlighting the selection of the first type of managed resource in the listing, display a set of search parameters associated with the first type of selected resource enabling a user to define the first set of search criteria; and
      for a subsequent time duration after the first time duration: while highlighting the selection of the second type of managed resource in the listing, display a set of search parameters associated with the second type of selected resource enabling a user to define the second set of search criteria.

* * * * *